(12) United States Patent
Namkung et al.

(10) Patent No.: US 10,535,320 B2
(45) Date of Patent: Jan. 14, 2020

(54) HEAD-MOUNTED DISPLAY APPARATUS

(71) Applicant: Samsung Electronics Co., Ltd., Gyeonggi-do (KR)

(72) Inventors: Joo Namkung, Gyeonggi-do (KR); Mansu Han, Gyeonggi-do (KR); Dongil Son, Gyeonggi-do (KR); Chihyun Cho, Gyeonggi-do (KR); Jongchul Choi, Gyeonggi-do (KR); Changryong Heo, Gyeonggi-do (KR); Jungeun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 307 days.

(21) Appl. No.: 15/204,716

(22) Filed: Jul. 7, 2016

(65) Prior Publication Data
US 2017/0011706 A1 Jan. 12, 2017

(30) Foreign Application Priority Data
Jul. 7, 2015 (KR) .................. 10-2015-0096446

(51) Int. Cl.
*G02B 27/01* (2006.01)
*G09G 5/00* (2006.01)
(Continued)

(52) U.S. Cl.
CPC .......... *G09G 5/006* (2013.01); *G02B 27/017* (2013.01); *G06F 3/012* (2013.01); *G06F 3/013* (2013.01); *G06F 3/03547* (2013.01); *G06F 3/0416* (2013.01); *G06F 3/147* (2013.01); *G06F 3/1423* (2013.01); *G06F 3/16* (2013.01); *G09G 3/002* (2013.01); *G09G 5/005* (2013.01); *G09G 5/14* (2013.01); *G02B 2027/014* (2013.01); *G02B 2027/0187* (2013.01); *G09G 2340/0435* (2013.01); *G09G 2340/0464* (2013.01); *G09G 2340/14* (2013.01); *G09G 2354/00* (2013.01);
(Continued)

(58) Field of Classification Search
None
See application file for complete search history.

(56) References Cited

U.S. PATENT DOCUMENTS 8,190,749 B1 * 5/2012 Chi ................ G02B 27/01
709/201
8,605,008 B1 12/2013 Prest et al.
(Continued)

FOREIGN PATENT DOCUMENTS

KR         10-1419007       7/2014
KR    10-2014-0129936    11/2014

*Primary Examiner* — Latanya Bibbins
(74) *Attorney, Agent, or Firm* — The Farrell Law Firm, P.C.

(57) ABSTRACT

Provided is a head-mounted display (HMD) apparatus and a method of controlling information output for the HMD apparatus. The HMD apparatus includes a frame in which one or more devices are installable, an interface unit to functionally connect to at least one of one or more devices installed in the frame and an external device, a detection unit to detect a user input, and a processor to perform a process of determining the one or more devices installed in the frame, controlling the interface unit according to the determination result, and controlling the one or more devices installed in the frame and the external device on the basis of user input detected through the detection unit.

20 Claims, 37 Drawing Sheets

(51) Int. Cl.
*G06F 3/16* (2006.01)
*G06F 3/01* (2006.01)
*G06F 3/041* (2006.01)
*G06F 3/0354* (2013.01)
*G06F 3/14* (2006.01)
*G06F 3/147* (2006.01)
*G09G 3/00* (2006.01)
*G09G 5/14* (2006.01)

(52) U.S. Cl.
CPC ..... *G09G 2360/04* (2013.01); *G09G 2370/12* (2013.01); *G09G 2370/16* (2013.01); *G09G 2370/22* (2013.01)

(56) References Cited

U.S. PATENT DOCUMENTS

| | | |
|---|---|---|
| 2008/0088529 A1 | 4/2008 | Tang |
| 2008/0088936 A1 | 4/2008 | Tang et al. |
| 2008/0088937 A1 | 4/2008 | Tang |
| 2010/0079356 A1* | 4/2010 | Hoellwarth .......... G02B 27/017 345/8 |
| 2012/0274653 A1 | 11/2012 | Tang et al. |
| 2014/0098009 A1 | 4/2014 | Prest et al. |
| 2014/0152531 A1 | 6/2014 | Murray et al. |

\* cited by examiner

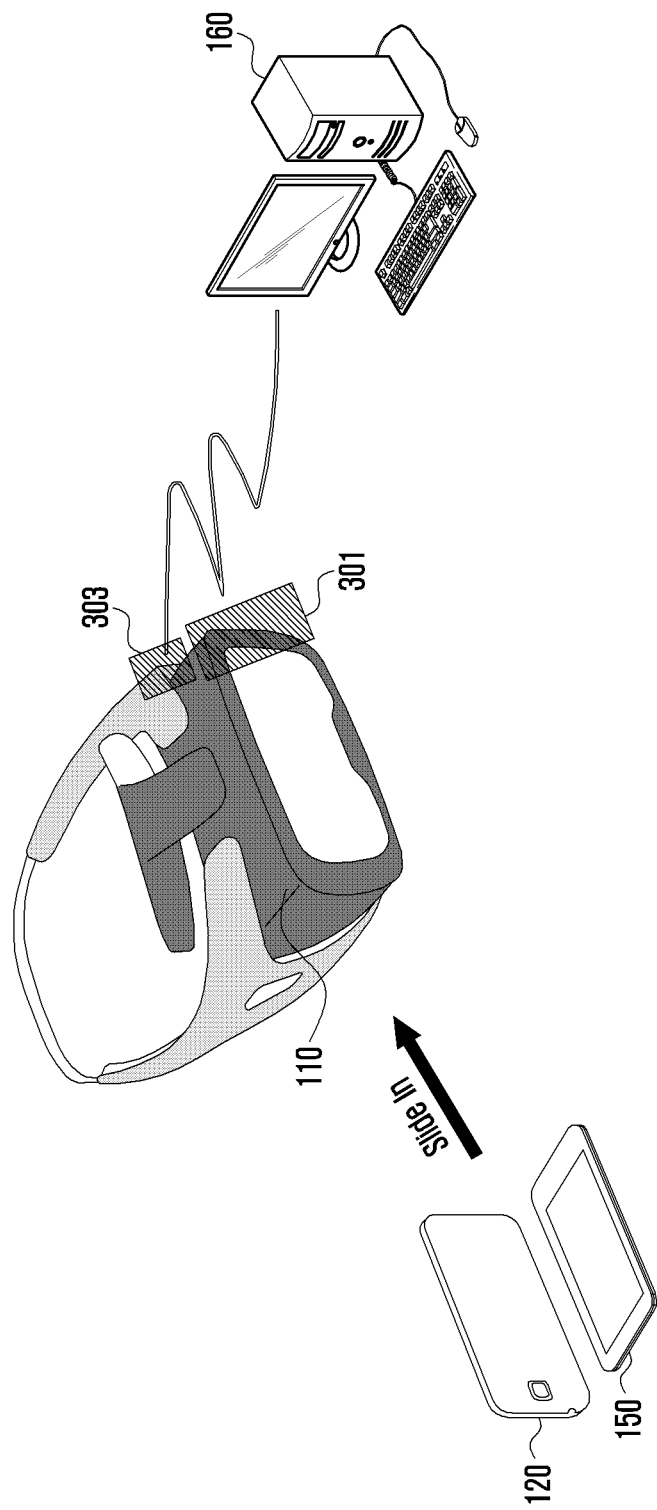

HEAD-MOUNTED DISPLAY APPARATUS

PRIORITY

This application claims priority under 35 U.S.C. § 119(a) to Korean Patent Application No. 10-2015-0096446, filed on Jul. 7, 2015, in the Korean Intellectual Property Office, the entire disclosure of which is incorporated herein by reference.

BACKGROUND

1. Field of the Disclosure

Various embodiments of the present disclosure relate to a head-mounted display (HMD) apparatus in which multiple devices can be installed.

2. Description of the Related Art

Recently, some electronic devices have evolved into wearable devices that can be attached to human bodies, such as a smart watch worn on the wrist and a glass-type device worn on the head. Wearable devices have been made smaller, lighter and more stylish so as to be worn by users at all times.

In particular, a head-mounted display (HMD) apparatus, as a wearable device attachable to the body, can be worn on the head and display images.

Meanwhile, a HMD apparatus may receive and display graphical information processed by an external device functionally connected to the HMD apparatus, or may display graphical information processed by an internal device installed in the HMD apparatus.

When the HMD apparatus receives and displays graphical information processed by an external device functionally connected thereto, as there is a wired connection between the HMD apparatus and the external device, the HMD apparatus may be used only at restricted places.

When the HMD apparatus displays graphical information processed by an internal device installed therein, as graphical information processing and display are performed within a single electronic device, there may be usage time restriction and heating problems.

SUMMARY

The present disclosure has been made to address at least the above mentioned problems and/or disadvantages and to provide at least the advantages described below.

Accordingly, an aspect of the present disclosure is to provide a head-mounted display apparatus that is configured to allow multiple devices to be installed and removed.

Accordingly, another aspect of the present disclosure is to provide a head-mounted display apparatus that can display graphical information in an interface mode corresponding to an installed device among multiple removably installable devices.

In accordance with an aspect of the present disclosure, a head-mounted display (HMD) apparatus is provided. The HMD apparatus includes a frame in which one or more devices are installable, an interface unit to functionally connect to at least one of one or more devices installed in the frame and an external device, a detection unit to detect a user input, and a processor to perform a process of determining the one or more devices installed in the frame, controlling the interface unit according to the determination result, and controlling the one or more devices installed in the frame and the external device on the basis of user input detected through the detection unit.

In accordance with another aspect of the present disclosure, a head-mounted display (HMD) apparatus is provided. The HMD apparatus includes a frame having a display module device, an interface unit to functionally connect to at least one of a device installed in the frame and an external device, a detection unit to detect a user input, and a processor to control an electronic device installed in the frame and the external device in response to installation of the electronic device.

In accordance with another aspect of the present disclosure, there is provided a method of controlling information output for a head-mounted display (HMD) apparatus. The method includes identifying, when a device is installed in a frame of the HMD apparatus, the device installed in the frame and controlling a function of the device installed in the frame according to the identification result.

In accordance with another aspect of the present disclosure, there is provided a method of controlling information output for a head-mounted display (HMD) apparatus. The method includes sending a virtual image received from an external device to a display module device included in the frame of the HMD apparatus, determining whether an electronic device is installed in the frame; and when the electronic device is installed, deactivating the display module device, and sending a virtual image received from the external device to the electronic device.

BRIEF DESCRIPTION OF THE DRAWINGS

The above and other aspects, features, and advantages of the present disclosure will be more apparent from the following detailed description taken in conjunction with the accompanying drawings, in which:

FIG. 3A illustrates an HMD apparatus connected to an external device, according to an embodiment of the present disclosure;

DETAILED DESCRIPTION OF EMBODIMENTS OF THE PRESENT DISCLOSURE

Figure 1A:
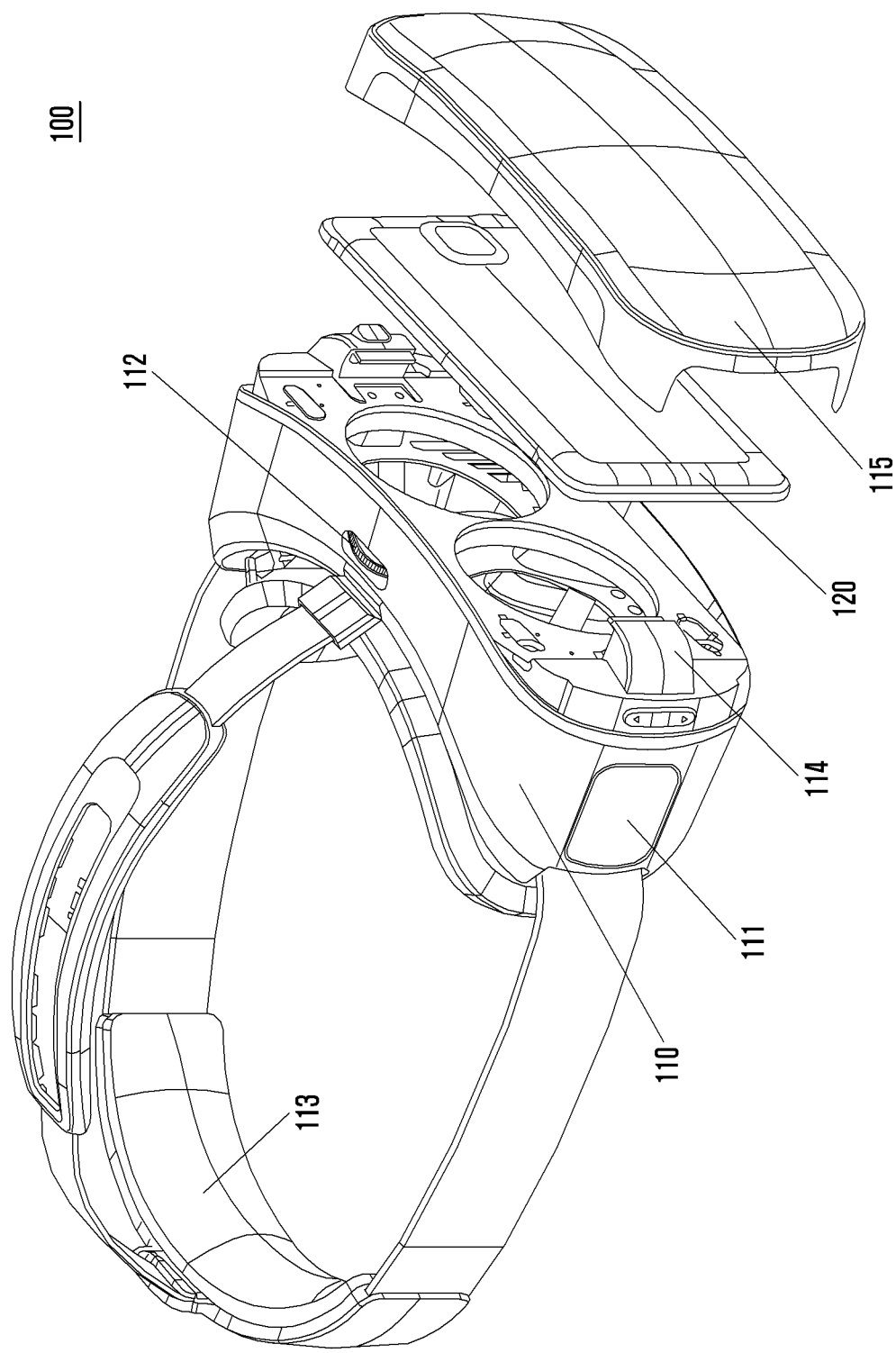
FIG. 1A illustrates a head mounted device (HMD) apparatus, according to an embodiment of the present disclosure.

Hereinafter, various embodiments of the present disclosure are described in detail with reference to the accompanying drawings. The description includes various specific details to assist in understanding, however, the present disclosure is not limited to the embodiments described herein. Accordingly, those of ordinary skill in the art will recognize that various changes and modifications of the embodiments described herein can be made without departing from the scope and spirit of the present disclosure. The same or similar reference numerals are used throughout the drawings to refer to the same or like parts.

It will be understood that the terms "comprising", "including", "having" and variants thereof specify the presence of stated features (e.g., values, functions, steps, operations, elements, or components), but do not preclude the presence or addition of one or more other features.

In the description, the phrases "A or B" or "at least one of A and/or B" may include any and all combinations of one or more of the listed items. For example, "A or B" or "at least one of A or/and B" each may refer to A, B, or both A and B.

The terms as used herein are provided merely to describe some embodiments, but may not limit other embodiments. It is to be understood that the singular forms "a," "an," and "the" include plural references unless the context clearly dictates otherwise. All terms, including technical and scientific terms, used herein have the same meaning as commonly understood by one of ordinary skill in the art to which this disclosure belongs. Further, the terms should be interpreted as having a meaning that is consistent with their meaning in the context of the specification and the relevant art and should not be interpreted in an idealized or overly formal sense, unless expressly so defined herein.

In an embodiment of the present disclosure, an "electronic device" may refer to at least one of, for example, a smartphone, a tablet computer, a mobile phone, a video phone, an e-book reader, a netbook computer, a personal digital assistant (PDA), a portable multimedia player (PMP), an MP3 player, and a camera.

In an embodiment of the present disclosure, a display module device may include a flexible display. The flexible display, using a thin and flexible substrate, like a sheet of paper, can be curved, bended, and rolled without damage.

Hereinafter, a description is given of an electronic device according to an embodiment with reference to the drawings. In the description, the word "user" may refer to a person using an electronic device or a device using an electronic device (e.g. artificial intelligence device).

In an embodiment, the head-mounted display (HMD) apparatus may determine whether an electronic device or display module device is installed in the frame and control operations of the interface unit according to the determination. When an electronic device is installed in the frame, the HMD apparatus may forward a detected user input signal or sensor signal to the electronic device. The electronic device may generate and display a virtual image on the basis of the user input signal or sensor signal received from the HMD apparatus.

In an embodiment, when a display module device is installed in the frame, the HMD apparatus may determine whether the display module device is connected with an external device through wired or wireless communication. When an external device is connected, the HMD apparatus may control the display module device so that the display module device receives a virtual image from the external device and displays the received virtual image. In addition, the HMD apparatus may forward a detected user input signal or sensor signal to the external device. The HMD apparatus may receive a virtual image generated based on the user input signal or sensor signal from the external device and forward the received virtual image to the display module device. Then, the display module device may display the received virtual image.

In an embodiment, while controlling operation of the interface unit after installation of an electronic device in the frame, the HMD apparatus may detect an external device being connected to the frame or electronic device. Upon detecting an external device being connected, the HMD apparatus may receive a virtual image from the external device and forward the received virtual image to the electronic device. Then, the electronic device may display the received virtual image on the display unit thereof.

In an embodiment, the user may install an electronic device or display module device in the frame according to usage conditions. The HMD apparatus may control operations of the interface unit in accordance with the device installed in the frame. Hence, the user may efficiently utilize the HMD apparatus in conformity with usage conditions.

FIG. 1A illustrates a head mounted device (HMD) apparatus, according to an embodiment of the present disclosure.

Referring to FIG. 1A, an HMD apparatus 100 includes a frame 110, a touchpad 111, a position adjuster 112, a wearing part 113, a connector 114, and a cover 115.

The frame 110 includes a space or structure to hold or accommodate an electronic device 120. The electronic device 120 may be removably installable in the frame 110. For display adjustment, the frame 110 includes at least one position adjuster 112 or lens adjuster in the external surface thereof.

The position adjuster 112 may be in the form of a wheel or dial. The user may rotate the wheel or dial acting as a display position adjuster to move the electronic device 120 installed in the frame 110, adjusting the distance to the display of the electronic device 120. That is, to enjoy good images matching the eyesight, the user may manipulate the position adjuster 112 to adjust the position of the electronic device 120.

In an embodiment, the frame 110 includes an input part at the side thereof to control the electronic device 120. The input part may be at least one of a physical key, physical button, touch key, joystick, wheel key, and the touchpad 111.

The touchpad 111 detects direct contact (i.e., a touch) or hovering input of the user. As the electronic device 120 and the frame 110 are interconnected through an interface, such as a universal serial bus (USB), a touch input signal detected by the touchpad 111 is transferred to the electronic device 120. The electronic device 120 carries out a function corresponding to the touch input signal received from the touchpad 111 of the HMD apparatus 100.

Specifically, a graphical user interface (GUI) is used to control a function of the electronic device 120 according to touch input detected on the touchpad 111. For example, a sound setting GUI of the HMD apparatus 100 may be used to adjust the volume of audio output of the electronic device 120 according to a touch input detected on the touchpad 111. An image playback GUI of the HMD apparatus 100 may be used to control the image (e.g. virtual image) displayed on the electronic device 120 according to a touch input detected on the touchpad 111.

The wearing part 113 is firmly coupled to the frame 110 so that the frame 110 can be fixed at a part of the human body (e.g., surroundings of the eyes). The wearing part 113 may include a band composed of elastic materials, and may be in the form of eyeglass temples, helmet, or straps.

The frame 110 includes a connector 114 enabling the frame 110 to connect to electrical contacts of the electronic device 120 for communication. The connector 114 may be a USB connector connectable to electrical contacts (e.g. USB ports) of the electronic device 120. The HMD apparatus 100 sends a signal detected on the GUI to the electronic device 120 through electrical contacts of the USB connector.

The HMD apparatus 100 further includes a cover 115, which can be coupled to the frame 110 so that the electronic device 120 installed in the frame 110 is firmly supported.

The cover 115 is physically coupled to the frame 110 like a hook or be coupled in an electromagnetic way using a magnet. The cover 115 prevents the electronic device 120 from being detached from the frame 110.

A display module device 150 is installed in the frame 110 of the HMD apparatus 100. The display module device 150, shown in FIG. 3A, may be removably installed in the frame 110. The display module device 150 may be composed of a flexible display. The flexible display, using a thin and flexible substrate, can be curved, bended, and rolled without damage.

When the display module device 150 is installed in the frame 110 of the HMD apparatus 100, an external device 160 may be connected wirelessly or by wire to the frame 110 or the display module device 150. When the display module device 150 is installed in the frame 110, the HMD apparatus 100 receives a virtual image from the external device 160 and forwards the virtual image to the display module device 150. Then, the display module device 150 displays the virtual image received from the HMD apparatus 100.

Figure 1B:
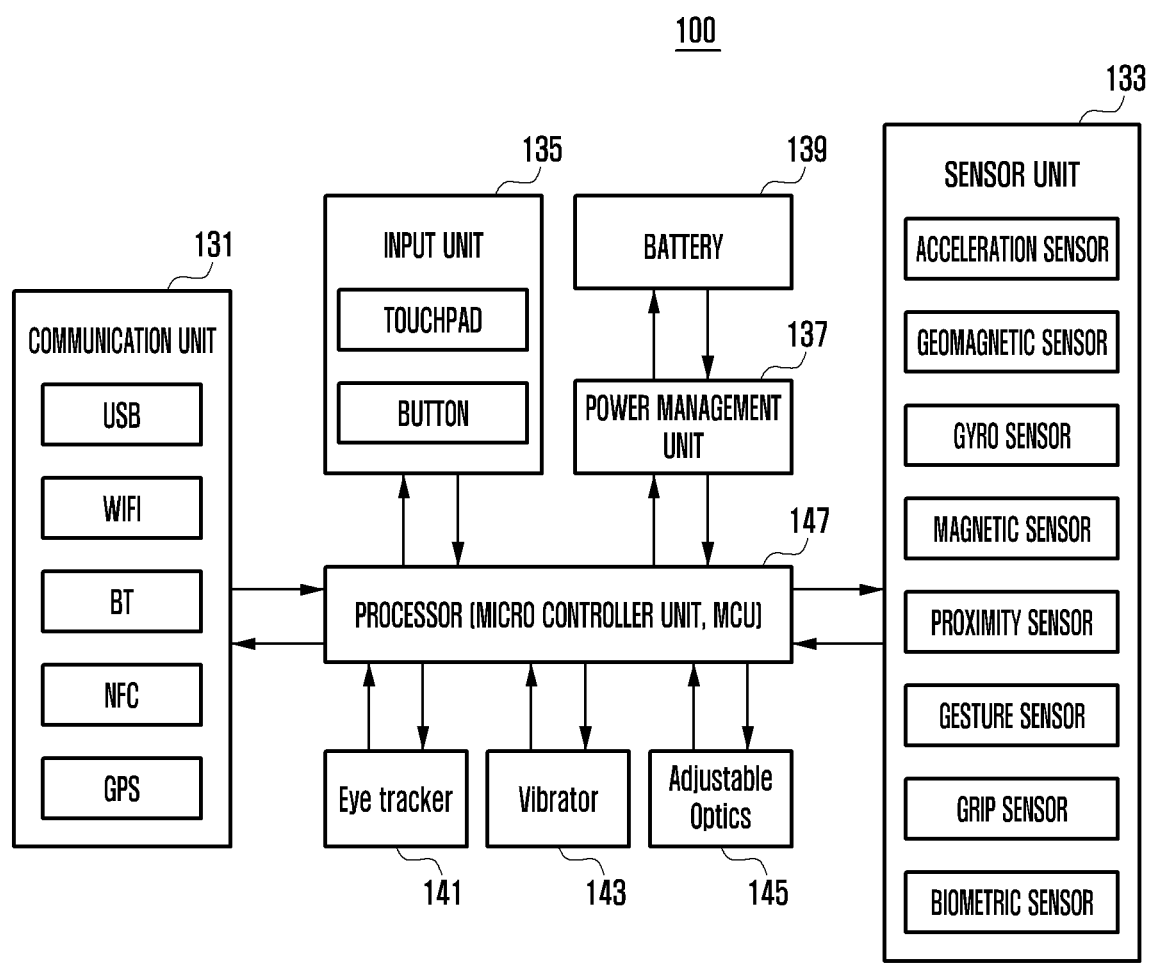
FIG. 1B is a block diagram of an HMD apparatus, according to an embodiment of the present disclosure.

FIG. 1B is a block diagram of an HMD apparatus, according to an embodiment of the present disclosure.

Referring to FIG. 1B, the HMD apparatus 100 includes a communication unit 131, a sensor unit 133, an input unit 135, a power management unit 137, a battery 139, an eye tracker 141, a vibrator 143, adjustable optics 145 or lens assembly, and a processor (or microcontroller unit, MCU) 147.

The HMD apparatus 100 may further include components not shown in FIG. 1B, such as a display unit.

In an embodiment, some components shown in FIG. 1B may be included in the frame 110 of the HMD apparatus 100, and some other components may be included in the electronic device 120 or display module device 150 removably installed in the frame 110.

The communication unit 131 is used to electrically connect the frame 110 of the HMD apparatus 100 to the electronic device 120 for data transmission and reception through wired or wireless communication. The communication unit 131 may also be used to electrically connect the frame 110 or display module device 150 to the external device 160 for data transmission and reception through wired or wireless communication.

The communication unit 131 may include a USB module, Wi-Fi module, Bluetooth (BT) module, near field communication (NFC) module, and global positioning system (GPS) module. Two or more of the Wi-Fi module, Bluetooth module, NFC module, and GPS module may be included in a single integrated chip (IC) or IC package.

The sensor unit 133 measures physical quantities or senses operating states of the HMD apparatus 100 and converts the measured or sensed result into an electrical signal. The sensor unit 133 may include at least one of an acceleration sensor, geomagnetic sensor, gyro sensor, magnetic sensor, proximity sensor, gesture sensor, grip sensor, and biometric sensor. The sensor unit 133 may further include a control circuit to control one or more sensors therein.

In particular, the HMD apparatus 100 identifies whether it is worn or not by use of the proximity sensor or the grip sensor. Whether the HMD apparatus 100 is worn may be identified by sensing a change in at least one of IR, pressure, and capacitance (or dielectric permittivity) due to wearing of the HMD apparatus 100. The HMD apparatus 100 senses movement of the head of the user wearing the HMD apparatus 100 by use of the acceleration sensor, geomagnetic sensor, and/or gyro sensor.

In an embodiment, some members of the sensor unit 133 may be included in the electronic device 120 or display module device 150 removably installed in the frame 110.

The movement of the hand or finger of the user is sensed by the gesture sensor and the sensing result is fed to the HMD apparatus 100 as control input.

The biometric sensor may be an E-nose sensor, electromyography (EMG) sensor, electroencephalogram (EEG) sensor, electrocardiogram (ECG) sensor, or iris sensor. The HMD apparatus 100 recognizes biometric information of the user by use of the biometric sensor.

The input unit 135 may include a touchpad 111 and a button. The touchpad 111 senses touch input using capacitive, resistive, infrared, or ultrasonic techniques. The touchpad 111 may further include a control circuit. The touchpad 111 using a capacitive technique senses physical contact or proximity input. When the touchpad 111 further includes a tactile layer, it may provide the user with a sense of touch. The button may be a physical button, or an optical key or keypad.

The power management unit 137 supplies power needed to operate the HMD apparatus 100. The battery 139 stores or generates electricity and supplies power to the HMD apparatus 100. The battery 139 may be included in the frame 110 as a part. The battery 139 may be functionally connected to the electronic device 120 removably installed in the frame 110 or to the external device 160.

The eye tracker 141 may track eye movement of the user by using at least one of an electrooculography (EOG) sensor, coil system, dual Purkinje system, bright pupil system, and dark pupil system. The eye tracker 141 may further include a micro camera to track eye movement.

The vibrator 143 converts an electrical signal into a mechanical vibration.

The adjustable optics 145 measures the interpupillary distance (IPD) of the user to adjust the lens distance and display position of the electronic device 120 so that the user may enjoy an image conforming to the eyesight.

The processor (or MCU) 147 executes the operating system (OS) and embedded software to control various hardware components connected thereto.

Figure 2:
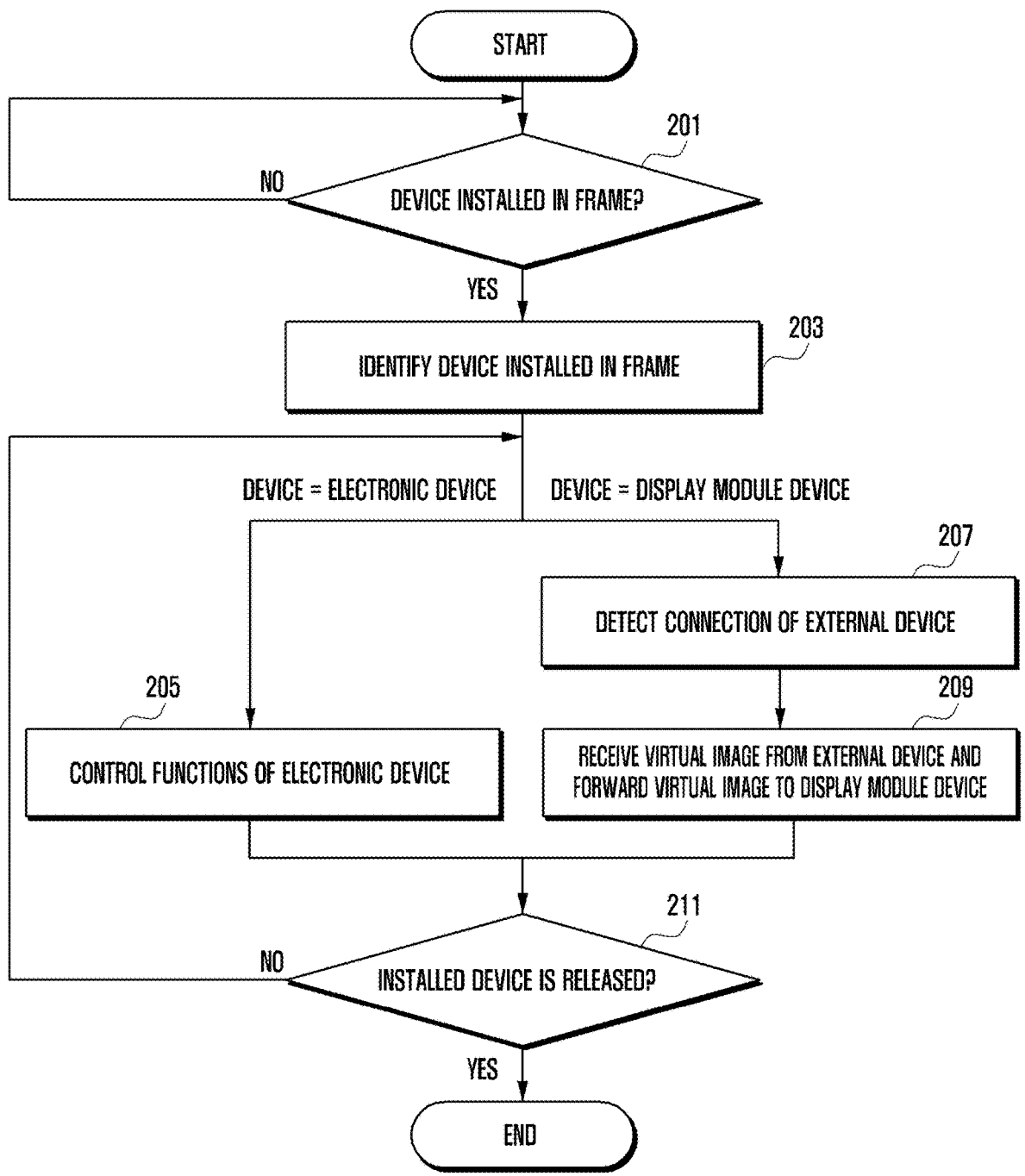
FIG. 2 is a flowchart of a procedure for controlling an interface unit on the basis of a device installed in the HMD apparatus, according to an embodiment of the present disclosure.

FIG. 2 is a flowchart of a procedure for controlling the interface unit on the basis of a device installed in the HMD apparatus, according to an embodiment of the present disclosure.

Referring to FIG. 2, at step 201, the HMD apparatus 100 detects device installation in the frame 110. At step 203, the HMD apparatus 100 identifies the device installed in the frame 110. The device installable in the frame 110 may be an electronic device 120 or a display module device 150. That is, the HMD apparatus 100 may determine whether either an electronic device 120 or a display module device 150 is installed in the frame 110 at step 203.

If an electronic device 120 is installed in the frame 110, at step 205, the HMD apparatus 100 controls the function of the electronic device 120 in a first interface mode. For example, the HMD apparatus 100 receives an audio signal from the electronic device 120 through the interface unit and outputs the received audio signal. The electronic device 120 installed in the frame 110 generates a virtual image and displays the virtual image on the display unit thereof. In other words, the electronic device 120 installed in the frame 110 performs graphical processing to generate a virtual image and display the virtual image on the display unit of the electronic device 120. In addition, the HMD apparatus 100 forwards a detected user input signal or sensor signal to the electronic device 120 through the interface unit. The electronic device 120 generates a virtual image on the basis of the user input signal or sensor signal received from the HMD apparatus 100 and displays the virtual image on the display unit thereof.

When the electronic device 120 is installed in the frame 110, the electronic device 120 is used to generate and display a virtual image. Hence, the HMD apparatus 100 is used without a connection to an external device 160, increasing the level of portability and convenience for the user.

If a display module device 150 is installed in the frame 110, at step 207, the HMD apparatus determines whether an external device 160 is connected wirelessly or by wire to the frame 110 or display module device 150. When an external device 160 is connected, at step 209, the HMD apparatus receives a virtual image from the external device and forwards the received virtual image to the display module device 150 according to a second interface mode.

At step 211, the HMD apparatus 100 determines whether the device installed in the frame 110 is disconnected. That is, when the electronic device 120 is installed in the frame 110, the HMD apparatus 100 determines whether the electronic device 120 is disconnected or released. When the display module device 150 is installed in the frame 110, the HMD apparatus 100 determines whether the display module device 150 is disconnected or released. Here, device disconnection may also indicate termination of virtual image display (e.g., turning off of the electronic device 120 or external device 160). If the device installed in the frame 110 is disconnected, the HMD apparatus 100 ends display of a virtual image. If the device installed in the frame 110 is not disconnected, the procedure returns to step 205 (for electronic device 120) or step 207 (for display module device 150).

When the display module device 150 is installed in the frame 110, the external device 160 being connected to the frame 110 or display module device 150 performs graphical processing to generate a virtual image. The HMD apparatus 100 receives the virtual image from the external device 160 and forwards the virtual image to the display module device 150, which then displays the virtual image. Here, the display module device 150 displays the virtual image received from the external device 160 only without performing graphical processing for virtual image generation.

When the display module device 150 is installed in the frame 110, the display module device 150 performs display operation only to display a virtual image received from the external device 160. Hence, it is possible to reduce heat generation and current consumption in the frame 110 due to data processing, contributing to stable power supply and effective virtual image processing.

FIG. 3A illustrates an HMD apparatus connected to an external device, according to an embodiment of the present disclosure.

Referring to FIG. 3A, the HMD apparatus 100 connected to the external device 160 is provided. An electronic device 120 or display module device 150 is installed in the frame 110 of the HMD apparatus 100. As previously described, when the electronic device 120 is installed 301 in the frame 110, the HMD apparatus 100 controls the function of the electronic device 120 in the first interface mode. That is, in the first interface mode, the electronic device 120 generates a virtual image and displays the virtual image on the display unit of itself.

When the display module device 150 is installed in the frame 110 and an external device 160 is connected to the frame 110, the HMD apparatus 100 receives a virtual image from the external device 160 and forwards the received virtual image to the display module device 150.

Figure 3B:
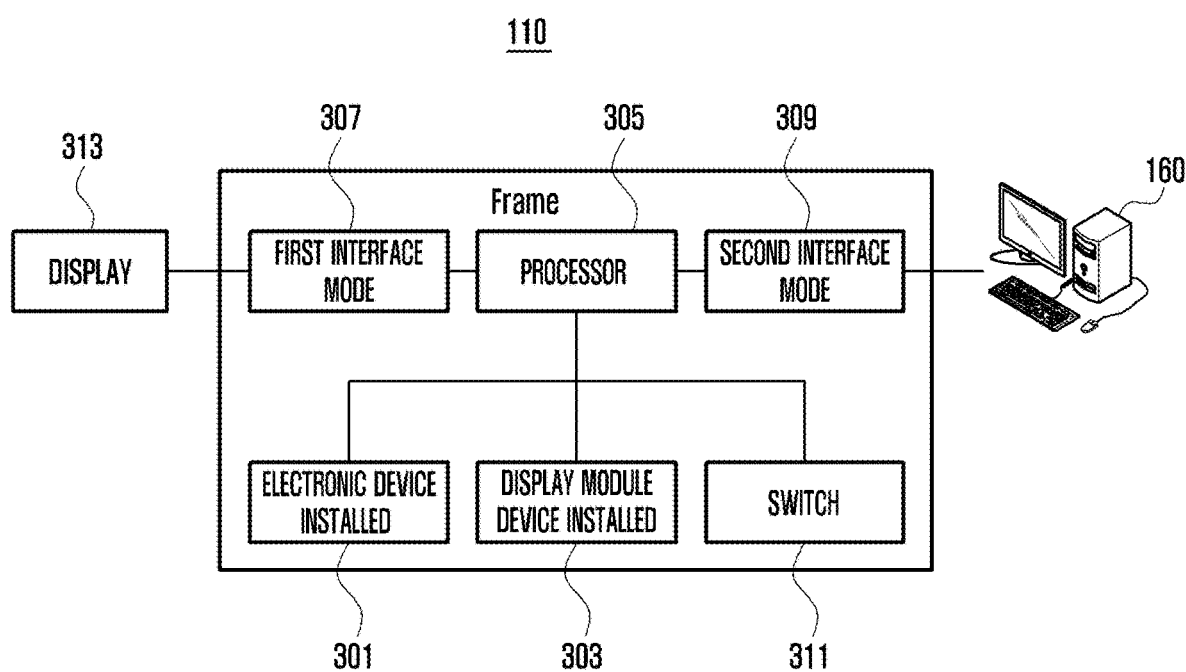
FIG. 3B is a diagram illustrating the operation modes of an HMD apparatus, according to an embodiment of the present disclosure.

FIG. 3B is a diagram illustrating the operation modes of an HMD apparatus, according to an embodiment of the present disclosure.

Referring to FIG. 3B, in an embodiment, the frame 110 of the HMD apparatus 100 is configured to hold or accommodate one or more devices. When the electronic device 120 is installed 301 in the frame 110, the HMD apparatus 100 operates in the first interface mode 307. In the first interface mode, the electronic device 120 generates a virtual image and displays 313 the virtual image on the display unit thereof.

When the display module device 150 is installed 303 in the frame 110 and an external device 160 is connected to the frame 110 or display module device 150, the HMD apparatus 100 operates in the second interface mode 309, receives a virtual image from the external device 160, and forwards the received virtual image to the display module device 150.

In an embodiment, when an external device 160 is connected to the frame 110 or electronic device 120 during the first interface mode, the HMD apparatus 100 may switch 311 to the second interface mode. In the second interface mode, the HMD apparatus 100 receives a virtual image from the external device 160, and forwards the virtual image to the electronic device 120. The electronic device 120 displays 313 the received virtual image on the display unit thereof.

Figure 3C:
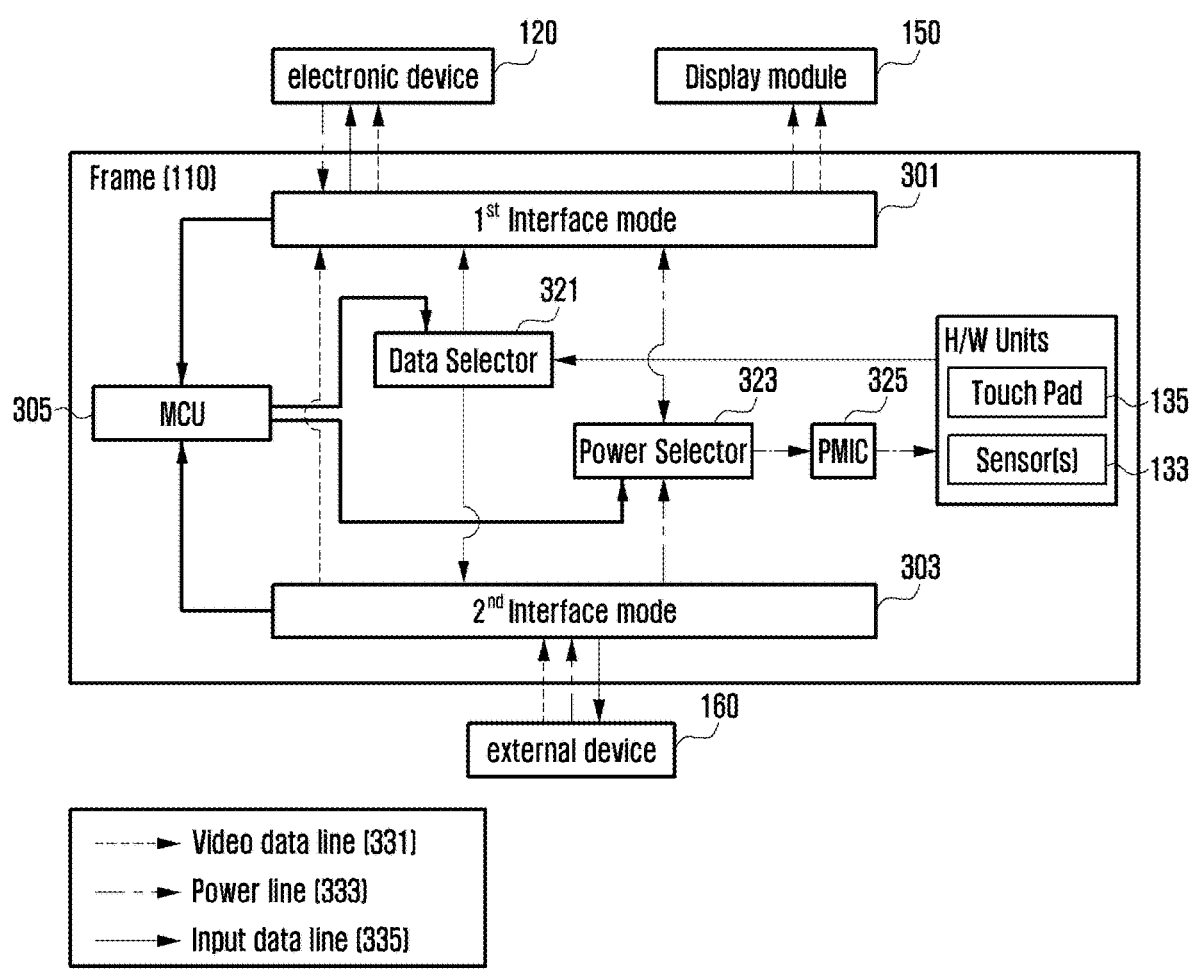
FIG. 3C is a signal flow diagram illustrating the operation modes of an HMD apparatus, according to an embodiment of the present disclosure.

FIG. 3C is a signal flow diagram illustrating the operation modes of an HMD apparatus, according to an embodiment of the present disclosure.

Referring to FIG. 3C, a signal flow diagram depicting flows of a virtual image signal 331, input signal 333, and power signal 335 in the first interface mode and in the second interface mode is provided.

For the input signal 333, the HMD apparatus 100 receives input information through the touchpad 135 and sensing data for head movement through the sensor unit 133, and forwards the input information and sensing data via the data selector 321 to the electronic device 120 in the first interface mode 310 and the external device 160 in the second interface mode 303.

For the virtual image signal 331, when the electronic device 120 is installed in the frame 110, the HMD apparatus 100 operates in the first interface mode 301. The HMD apparatus 100 controls the operation of the interface unit according to the first interface mode 301. In the first interface mode 301, the electronic device 120 generates a virtual image and displays the virtual image on the display unit thereof. When the display module device 150 is installed in the frame 110, the HMD apparatus 100 operates in the second interface mode 303. In the second interface mode 303, the HMD apparatus 100 receives a virtual image from the external device 160 and forwards the virtual image to the display module device 150. When the HMD apparatus 100 switches from the first interface mode 301 to the second interface mode 303, the HMD apparatus 100 receives a virtual image from the external device 160 and forwards the virtual image to the electronic device 120. The electronic device 120 displays the virtual image received from the HMD apparatus 100 on the display unit of the electronic device 120.

For the power signal 335, the external device 160 may have a power source to supply additional power and may supply power to the display module device 150 through the power selector 323. The external device 160 may also supply power to the HMD apparatus 100 through the power selector 323 and Power Management Integrated Circuit (PMIC) 325.

Figure 4A:
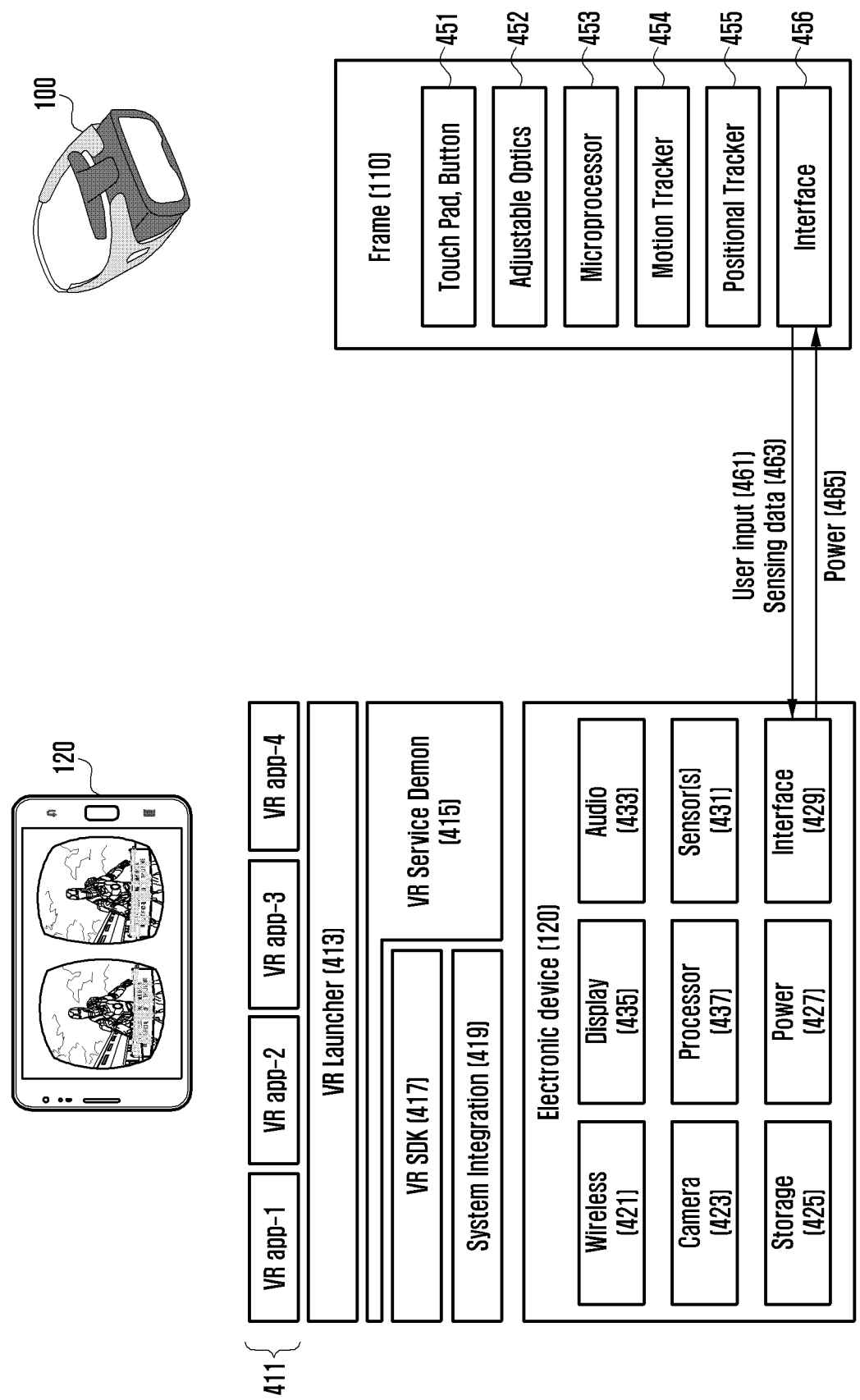
FIGS. 4A and 4B illustrate a linkage between an HMD apparatus and an electronic device installed in a frame of the HMD apparatus, according to an embodiment of the present disclosure.
Figure 4B:
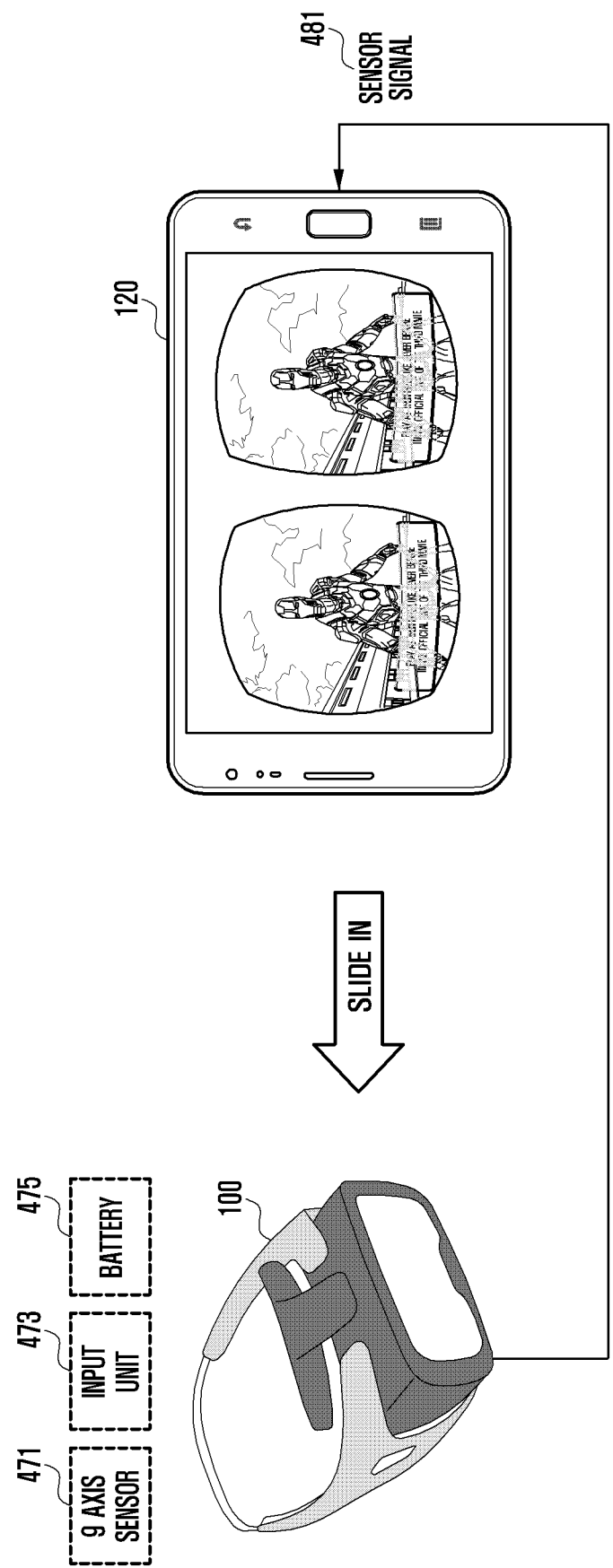

A detailed description is given of a case where the electronic device 120 being installed in the frame 110 generates a virtual image and displays the virtual image on the display unit thereof with reference to FIGS. 4A and 4B.

FIGS. 4A and 4B illustrate a linkage between an HMD apparatus and an electronic device installed in a frame of the HMD apparatus, according to an embodiment of the present disclosure.

Referring to FIG. 4A, the software of the electronic device 120 may include virtual reality (VR) apps 411, VR launcher 413, VR service demon 415, VR software development kit (SDK) 417, and system integration 419.

To produce VR images, the software of the electronic device 120 includes the VR SDK 417 and VR system drivers enabling the VR SDK 417 to smoothly run on the hardware.

The VR launcher 413 acting as a VR home screen displays icons corresponding to executable applications (i.e., the VR apps 411). The VR launcher 413 is automatically activated when the electronic device 120 is physically connected to the frame 110 of the HMD apparatus 100. The VR service demon 415 issues a command for splitting monocular images (e.g. virtual image) into binocular images in response to reception of a signal indicating connection to the frame 110 from the interface unit 429.

In an embodiment, the electronic device 120 includes a wireless unit 421, a camera 423, a storage unit 425, a power management unit 427, an interface unit 429, a sensor unit 431, an audio unit 433, a display unit 435, and a processor 437.

The wireless unit 421 wirelessly connects the electronic device 120 and the HMD apparatus 100 for communication. For example, the wireless unit 421 connects to a network through wireless communication and communicates with the HMD apparatus 100. Here, wireless communication may be based on, for example, Wi-Fi, BT, and NFC. Wireless communication may also be based on cellular communication (e.g. LTE, LTE-A, CDMA, WCDMA, UMTS, WIBRO and GSM).

The camera 423 may support see-through mode or positional tracking. The HMD apparatus 100 may realize see-through mode by use of the rear-facing camera of the electronic device 120. The preview screen for the rear-facing camera may be used to provide an augmented reality (AR) view.

The storage unit 425 includes a program region to store programs needed for operations of the electronic device 120, and a data region to store data such as log information generated during program execution, content, and objects.

The power management unit 427 includes a PMIC 325 and battery to supply power to the above components.

The interface unit 429 is used to communicate with the HMD apparatus 100 through wired communication. Here, wired communication may be based on USB, high definition multimedia interface (HDMI), recommended standard 232 (RS-232), or plain old telephone service (POTS). In addition, the interface unit 429 may be used to connect to the external device 160 through wired communication and may be used to supply power.

The sensor unit 431 is used to sense wearing of the HMD apparatus 100 and to track movement of the head of the user (head tracking). The sensor unit 431 senses movement of the head of the user wearing the HMD apparatus 100 by use of at least one of an acceleration sensor, gyro sensor, and geomagnetic sensor. The sensor unit 431 determines whether the HMD apparatus 100 is worn by sensing a change in at least one of IR, pressure, and capacitance (or dielectric permittivity).

The audio unit 433 sends an audio signal from the processor 437 to a speaker, and sends an audio signal, like a voice signal, from a microphone to the processor 437. The speaker outputs audio data received from an external device via the wireless unit 421 or stored in the storage unit 425. The speaker outputs audio signals associated with various functions or operations performed in the electronic device 120. In an embodiment, a detachable ear phone, head phone, or head set may be connected to the electronic device 120 through an external port and may be used as a speaker.

The display unit 435 displays various screens associated with operations of the HMD apparatus 100 under the control of the processor 437. The display unit 435 displays a virtual image as binocular images.

The processor 437 may decode a command for a component of the HMD apparatus 100 and perform operations or data processing according to the decoded command. For example, the processor 437 executes the operating system and embedded software to control various hardware components. The processor 437 may include an AP, CP, and sensor hub.

In an embodiment, the frame 110 of the HMD apparatus 100 may include a touchpad and button 451, adjustable optics 452, a microprocessor 453, a motion tracker 454, a positional tracker 455, and an interface 456. The frame 110 of the HMD apparatus 100 may further include sensors to provide additional or elaborate functions not supported by the electronic device 120. For example, the frame 110 includes a motion sensor to sense head tracking, a positional tracking sensor to sense absolute movement of the user (using magnetic fields or infrared camera), and a proximity and ambient light sensor or capacitive detection sensor to sense wearing of the HMD apparatus 100. The configuration of the HMD apparatus 100 is depicted in FIG. 1B, and a detailed description thereof is omitted.

When the electronic device 120 is installed in the frame 110 of the HMD apparatus 100, the frame 110 sends user input 461 received through the touchpad or button and sensing data 463 for head tracking and movement to the electronic device 120. The electronic device 120 generates a virtual image according to the user input and sensing data. The HMD apparatus 100 is supplied necessary power 465 from the electronic device 120. In other words, as the frame 110 of the HMD apparatus 100 and the electronic device 120 are interconnected via HDMI, USB or the like, user input 461, sensing data 463 and power 465 are transmitted.

Referring to FIG. 4B, the electronic device 120 may be installed in the frame 110 of the HMD apparatus 100. The frame 110 and the electronic device 120 may be connected via wired or wireless communication. After the frame 110 and the electronic device 120 are connected via wired or wireless communication, data is exchanged between the HMD apparatus 100 and the electronic device 120. For example, the HMD apparatus 100 may receive an audio signal from the electronic device 120 and output the same. The HMD apparatus 100 sends an input signal and sensor signal to the electronic device 120. The electronic device 120 generates and displays a virtual image according to the input signal and sensor signal received from the HMD apparatus 100.

The frame 110 of the HMD apparatus 100 includes a sensor unit 471 (e.g. 9-axis sensor) for head tracking, an input unit 473 to control virtual image display, and a battery 475 to supply additional power to the electronic device 120. If necessary, other components may be further included in the frame 110 of the HMD apparatus 100, or an existing component (e.g. sensor unit 471, input unit 473, or battery 475) of the frame 110 may be omitted.

When a sensor unit 471 is included in the frame 110, the HMD apparatus 100 sends head tracking data (i.e., a sensor signal 481 generated by the sensor unit 471) to the electronic device 120. When an input unit 473 for controlling virtual image display is included in the frame 110, the HMD apparatus 100 sends an input signal 481 generated by the input unit 473 to the electronic device 120. When a battery 475 is included in the frame 110, the HMD apparatus 100 supplies power to the electronic device 120.

Figure 5A:
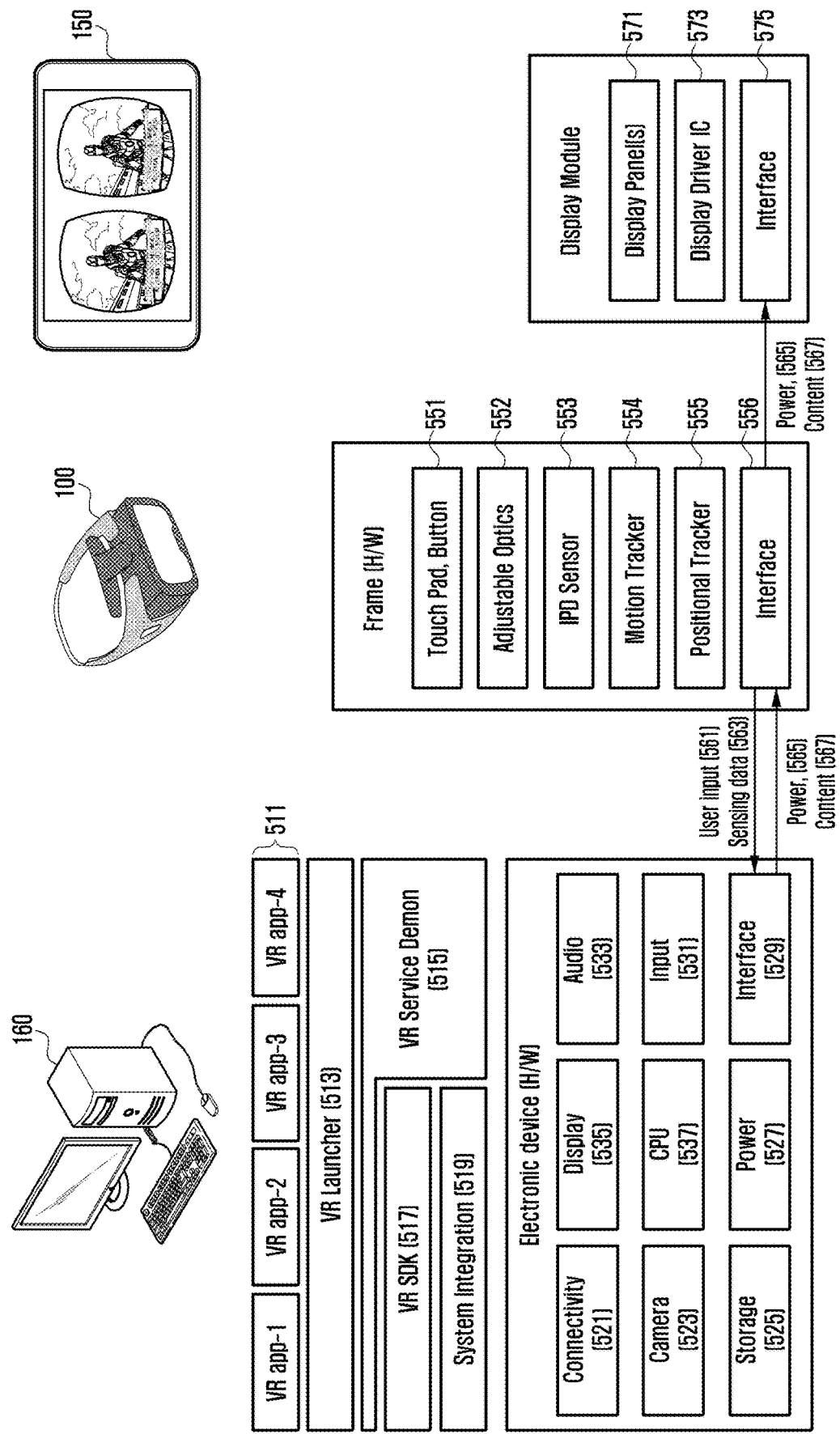
FIGS. 5A and 5B illustrate a linkage between an HMD apparatus, a display module device, and an external device when the display module device is installed in a frame of the HMD apparatus, according to an embodiment of the present disclosure.
Figure 5B:
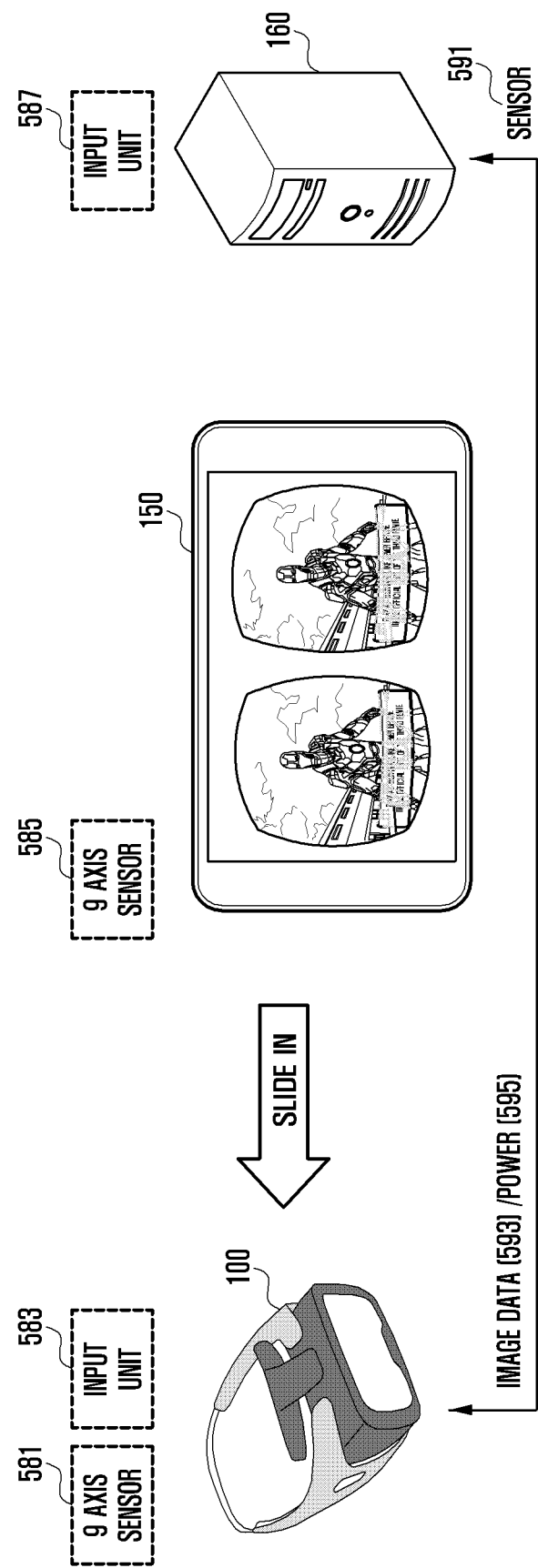

Next, a description is given of a configuration for virtual image display when the display module device 150 is installed in the frame 110 with reference to FIGS. 5A and 5B.

FIGS. 5A and 5B illustrate a linkage between an HMD apparatus, a display module device, and an external device when the display module device is installed in a frame of the HMD apparatus, according to an embodiment of the present disclosure.

Referring to FIG. 5A, the software of the external device 160 may include VR apps 511, VR launcher 513, VR service demon 515, VR SDK 517, and system integration 519. The software of the external device 160 is similar to that of the electronic device 120 shown in FIG. 4A, and a description thereof is omitted.

In an embodiment, the external device 160 includes a connectivity unit 521, a camera 523, a storage unit 525, a power management unit 527, an interface unit 529, an input unit 531, an audio unit 533, a display unit 535, and a processor (CPU) 537. The connectivity unit 521, camera 523, storage unit 525, power management unit 527, interface unit 529, audio unit 533, and display unit 535 of the external device 160 are similar to those shown in FIG. 4A, and a description thereof is omitted.

The input unit 531 may include a mouse and a keyboard.

In an embodiment, the frame 110 of the HMD apparatus 100 includes a touchpad 551, adjustable optics 552, IPD sensor 553, motion tracker 554, positional tracker 555, and interface unit 556. The frame 110 may further include a power circuit to supply power from the electronic device 120 to the display module device 150.

The IPD sensor 553 measures the distance between the two eyes of the user to adjust the lenses between the eyes.

The touchpad 551, adjustable optics 552, motion tracker 554, positional tracker 555, and interface unit 556 of the HMD apparatus 100 are similar to those shown in FIG. 1B, and a description thereof is omitted.

In an embodiment, the display module device 150 includes one or more display panels 571, a display driver IC 573, and an interface unit 575. The display panel 571 displays a virtual image received from the HMD apparatus 100 via the interface unit 575.

The external device 160 may be a personal computer (PC), a console, or a high-performance tablet computer. The external device 160 generates and processes binocular (left eye and right eye) virtual images and transfers the binocular virtual images to the display module device 150 or the frame 110 of the HMD apparatus 100.

In an embodiment of the present disclosure, the display module device 150 is installed in the frame 110 of the HMD apparatus 100, and the external device 160 is connected to the frame 110 or display module device 150. The HMD apparatus 100 sends the external device 160 user input 561 received through the touchpad or button of the frame 110 and sensing data 563 for head tracking and movement. The external device 160 generates a virtual image according to the received user input 561 and sensing data 563. The frame 110 receives the virtual image 567 from the external device 160 and forwards the virtual image 567 to the display module device 150.

In an embodiment, the external device 160 supplies power 565 to the frame 110 of the HMD apparatus 100 and the display module device 150.

Referring to FIG. 5B, the display module device 150 may be installed in the frame 110 of the HMD apparatus 100. The external device 160 is connected to the frame 110 or display module device 150 through wired or wireless communication. The display module device 150 receives a virtual image from the external device 160 and displays the received virtual image. More specifically, the HMD apparatus 100 receives a virtual image 593 from the external device 160 connected to the frame 110 or display module device 150 and forwards the virtual image 593 to the display module device 150. The display module device 150 displays the received virtual image 593.

In an embodiment, the frame 110 includes a sensor unit 581 (e.g. 9-axis sensor) and an input unit 583. When the frame 110 includes the sensor unit 581, the HMD apparatus 100 sends a sensor signal 491 (head tracking data) sensed by the sensor unit 581 to the external device 160. When the frame 110 includes the input unit 583 for virtual image control, the HMD apparatus 100 sends an input signal detected by the input unit 583 to the external device 160. When the frame 110 includes a battery, the HMD apparatus 100 may draw power 595 from the external device 160.

In an embodiment, the display module device 150 includes a sensor unit 585 (e.g. 9-axis sensor). When the display module device 150 includes the sensor unit 585, the display module device 150 sends a sensor signal 491 (head tracking data) sensed by the sensor unit 585 to the external device 160 via the HMD apparatus 100.

To control display of a virtual image on the display module device 150, the external device 160 receives an input signal through an input unit 587 (e.g., a mouse, keyboard, image sensor, microphone, and Kinect™ sensor) connected to the external device 160.

Figure 6:
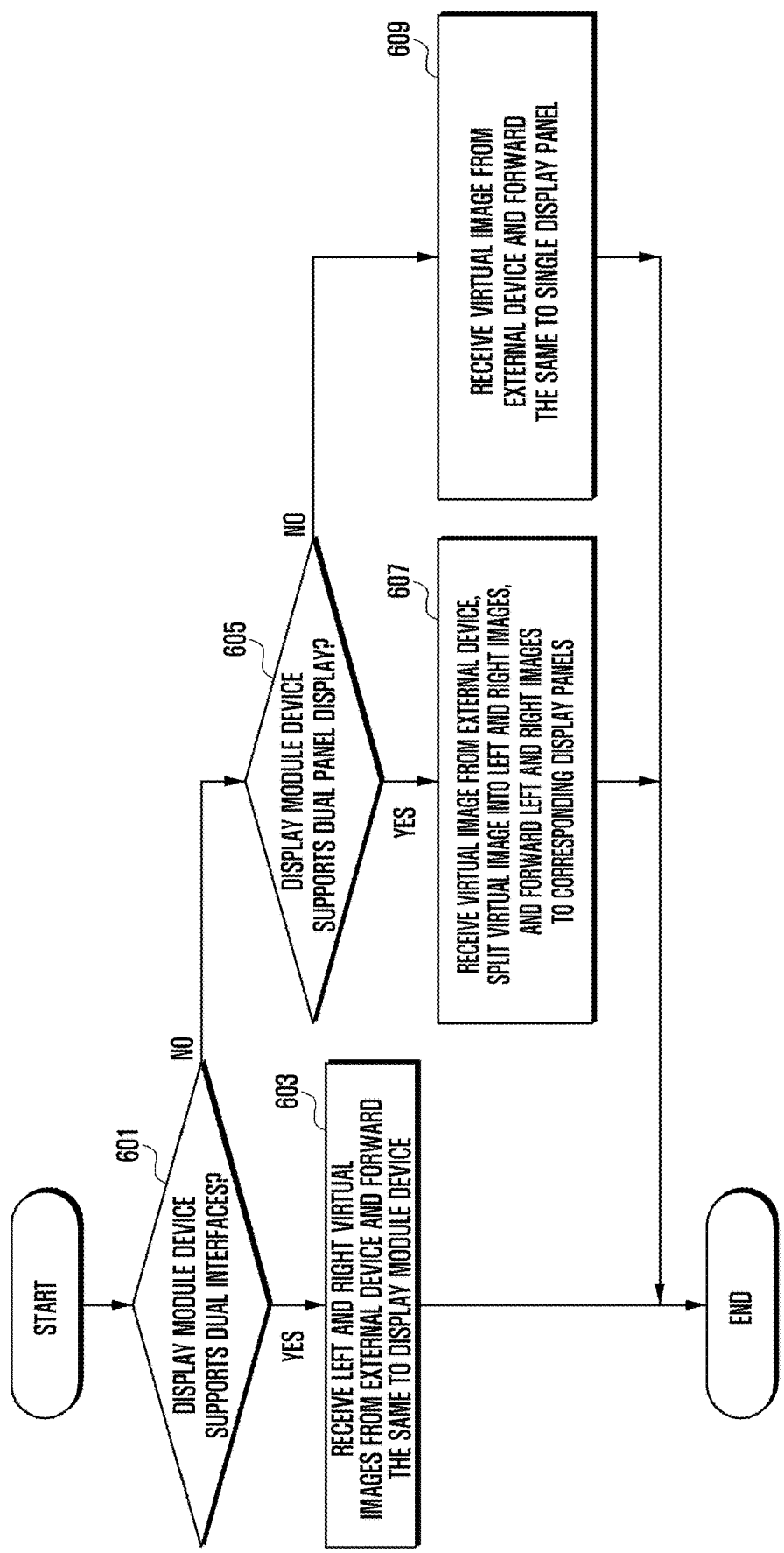
FIG. 6 is a flowchart of a procedure for displaying virtual images when a display module device is installed in a frame of an HMD apparatus, according to an embodiment of the present disclosure.

FIG. 6 is a flowchart of a procedure for displaying virtual images when a display module device is installed in a frame of an HMD apparatus, according to an embodiment of the present disclosure.

Referring to FIG. 6, when the display module device 150 is installed in the frame 110 of the HMD apparatus 100, the external device 160 for virtual image generation and processing is connected to the frame 110 or display module device 150. The display module device 150 may be configured to have a single interface to receive a virtual image from the external device 160 or to have dual interfaces to receive virtual images adapted respectively for the left eye and right eye. In addition, the display module device 150 may be configured to have a single panel or dual panels.

The display module device 150 may display a virtual image (e.g., stereoscopic image) on a single panel display unit having a single interface. The display module device 150 may also display a virtual image (e.g., stereoscopic image) on a dual panel display unit having left and right image interfaces. A virtual image sent from the external device 160 to the display module device 150 may be a stereoscopic image composed of left and right images and may be displayed by the HMD apparatus 100. The format (e.g., full frame or half frame) of a virtual image sent from the external device 160 to the display module device 150 may be varied according to capabilities of the external device 160 and display module device 150 (e.g., the number of supported interfaces and the number of physical display panels).

Referring to FIG. 6, step 209 of FIG. 2 is depicted. When the display module device 150 is installed in the frame 110, at step 601, the HMD apparatus 100 determines whether the display module device 150 supports a dual interface option. If the display module device 150 supports the dual interface option, at step 603, the HMD apparatus 100 receives a left virtual image and a right virtual image from the external device 160 and forwards the left virtual image and right virtual image to the display module device 150. More specifically, the HMD apparatus 100 receives a left virtual image from the first interface unit of the external device 160 and forwards the left virtual image to the first interface unit of the display module device 150. The HMD apparatus 100 receives a right virtual image from the second interface unit of the external device 160 and forwards the right virtual image to the second interface unit of the display module device 150. Then, the display module device 150 displays the left and right virtual images.

If the display module device 150 does not support the dual interface option, at step 605, the HMD apparatus 100 determines whether the display module device 150 supports dual panel display. If the display module device 150 supports dual panel display, at step 607, the HMD apparatus 100 receives a virtual image from the external device 160, splits the virtual image into left and right virtual images, and forwards the left and right virtual images to the corresponding display panels of the display module device 150.

If the display module device 150 does not support dual panel display, at step 609, the HMD apparatus 100 receives a virtual image from the external device 160 and forwards the virtual image for single panel display to the display panel of the display module device 150.

Next, with reference to FIGS. 7 to 10, a detailed description is provided of a virtual image display when the display module device 150 is installed in the frame 110.

Figure 7:
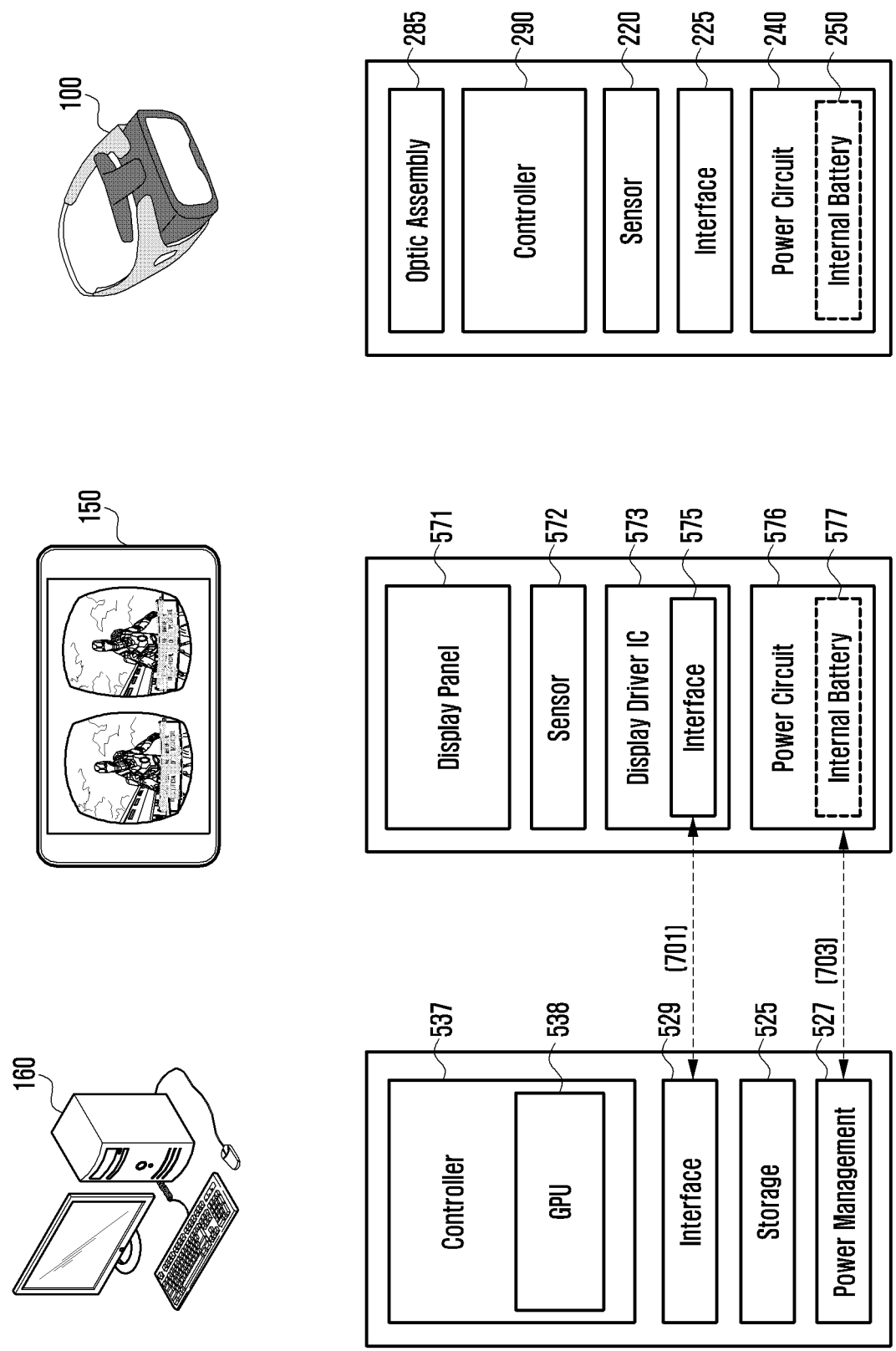
FIG. 7 illustrates a method for displaying virtual images when a display module device is installed in a frame of the HMD apparatus, according to an embodiment of the present disclosure.

FIG. 7 illustrates a method for displaying virtual images when a display module device is installed in a frame of the HMD apparatus, according to an embodiment of the present disclosure.

Referring to FIG. 7, the external device 160 generates a virtual image using a graphics processing unit (GPU) 538 of a processor 537 (alternatively, the GPU 538 may be external to the processor 537), and sends the virtual image through the interface unit 529 (e.g. USB, HDMI, MHL, Wi-Fi, UWB, WiGig, mmWave) to the display module device 150 via the HMD apparatus 100. The external device 160 includes a power management unit 527, and may supply power 703 to an internal battery 577 of the display module device 150.

The display module device 150 includes an interface unit 575, and receives the virtual image through the interface unit 575 and forwards the virtual image to a display driver IC (DDI) 573. The display driver IC 573 controls the operating voltage of pixels constituting the display panel 571 according to the received virtual image, reproducing colors. The power circuit 576 includes the internal battery 577. The display module device 150 also includes a sensor 572.

In an embodiment, the frame 110 of the HMD apparatus 100 includes an optic assembly 285 (e.g., adjustable optics 145), a controller 290 (e.g., a processor (or microcontroller unit, MCU) 147), a sensor 220 (e.g., a sensor unit 133), an interface 225 (e.g., interface unit 556), a power circuit 240. The power circuit 240 includes an internal battery 250 (e.g., a battery 139).

Figure 8A:
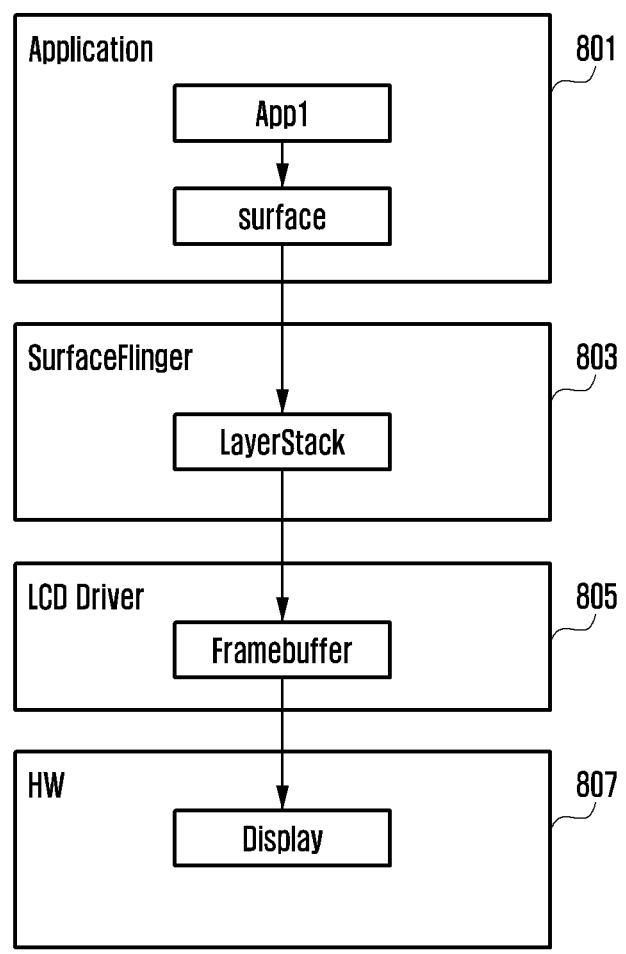
FIGS. 8A to 8C illustrate a method for displaying virtual images with a display module device supporting dual panel display with one physical interface, according to an embodiment of the present disclosure.
Figure 8B:
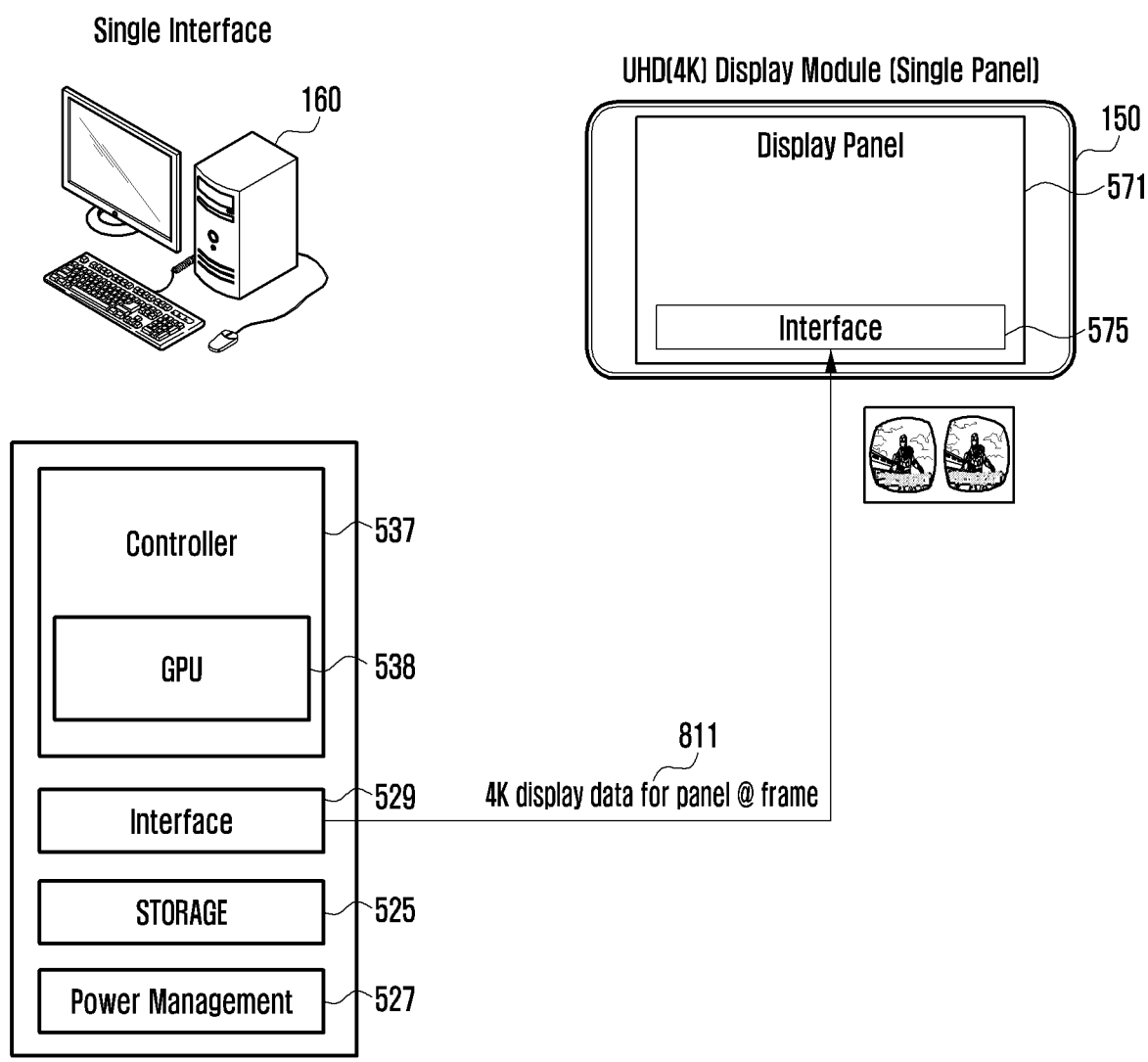
Figure 8C:
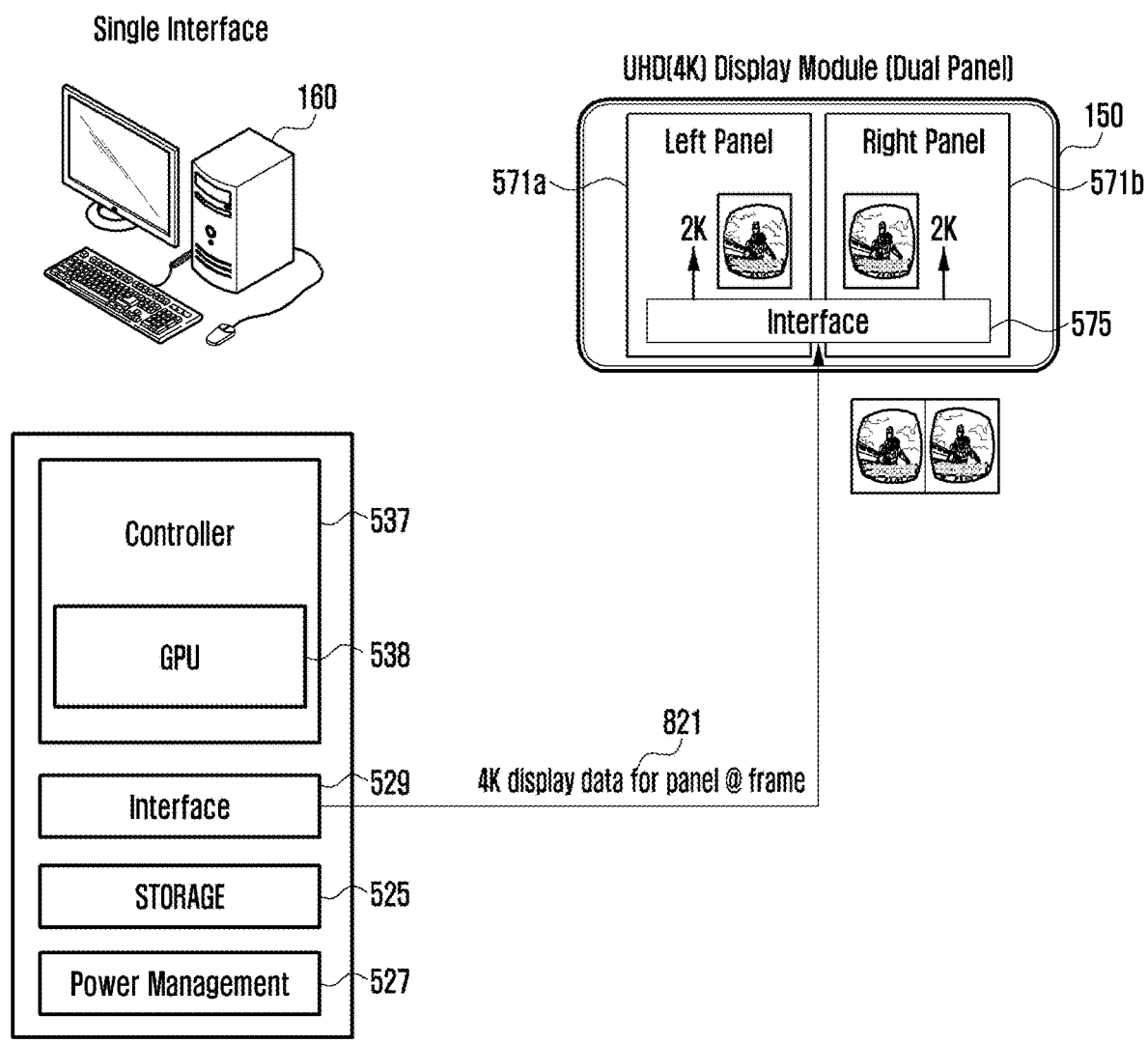

FIGS. 8A to 8C illustrate a method for displaying virtual images with a display module device supporting dual panel display with one physical interface, according to an embodiment of the present disclosure.

Referring to FIGS. 8A to 8C, it is possible to display a virtual image (e.g., a stereoscopic image) by the display module device 150 supporting dual panel display with one physical interface. When the display module device 150 has a single physical interface, the external device 160 may regard the display module device 150 as one piece of display hardware. That is, although the display module device 150 has two physical display panels, the external device 160 sends a virtual image composed of left and right images to the interface unit of the display module device 150. The display module device 150 splits the received virtual image into left and right images and displays the left and right images by use of the DDI. This procedure may also be applied to a case where the display module device 150 is configured to have a single physical display panel.

Referring to FIG. 8A, in the HMD apparatus 100, a specific application 801 or user program generates a surface (e.g., window or screen). SurfaceFlinger 803 may combine several surfaces into a single surface. SurfaceFlinger 803 between the application 801 and LCD Driver 805 sends the composited surface to the framebuffer of LCD Driver 805. LCD Driver 805 displays the composited surface on the screen 807.

Referring to FIG. 8B, the external device 160 may support a single interface and the display module device 150 installed in the frame 110 of the HMD apparatus 100 may support single panel display. The display module device 150 may have a 4K resolution. As the display module device 150 supports single panel display, the HMD apparatus 100 receives a 4K resolution virtual image 811 (e.g., stereoscopic image) at each frame from the interface unit 529 of the external device 160 and forwards the virtual image to the interface unit 575 of the display module device 150. The display module device 150 displays the received virtual image on the display panel 571.

Referring to FIG. 8C, the external device 160 may support a single interface and the display module device 150 installed in the frame 110 of the HMD apparatus 100 may support dual panel display with two physical panels. The display module device 150 may have a 4K resolution. As the display module device 150 supports dual panel display, the HMD apparatus 100 receives a 4K resolution virtual image 821 (e.g., stereoscopic image) at each frame from the interface unit 529 of the external device 160 and forwards the virtual image to the interface unit 575 of the display module device 150. The display module device 150 splits the virtual image 821 into 2K resolution left panel image and 2K resolution right panel image, and displays the left panel image and the right panel image on the left panel 571*a* and the right panel 571*b*, respectively.

Figure 9A:
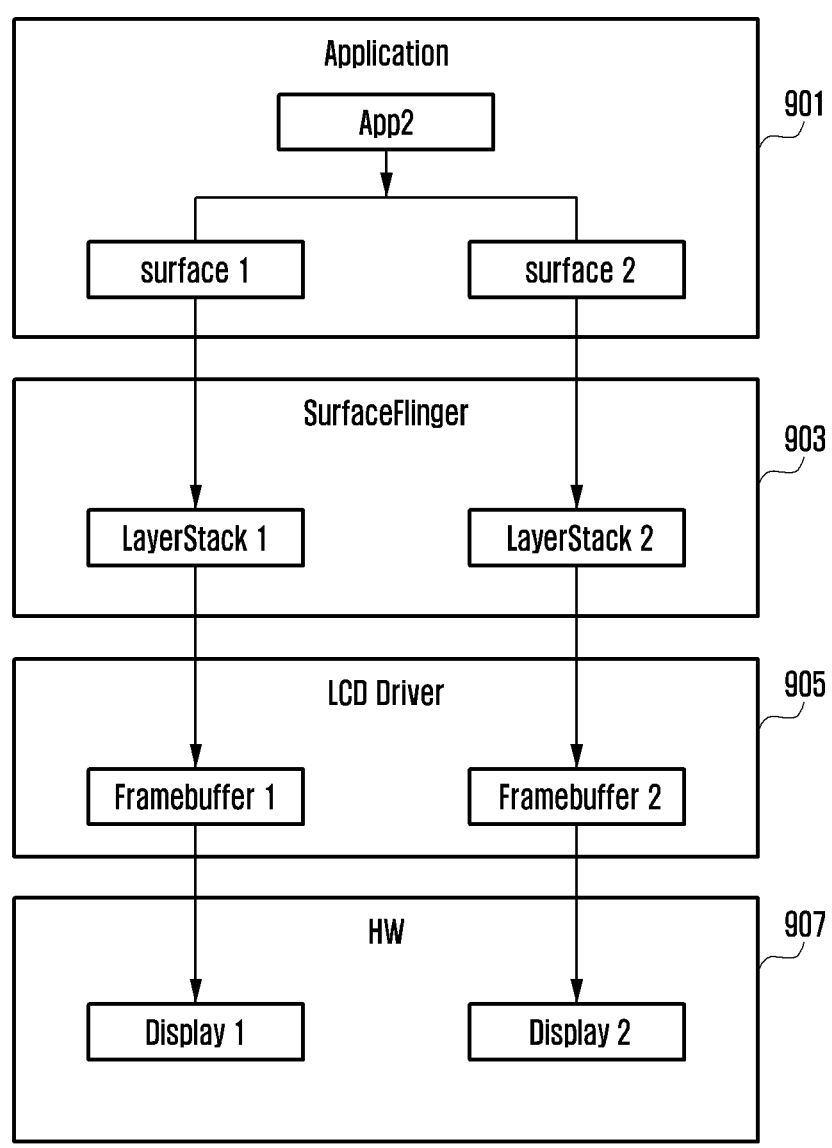
FIGS. 9A to 9B illustrate a method for displaying virtual images with a display module device supporting dual panel display with two physical interfaces, according to an embodiment of the present disclosure.
Figure 9B:
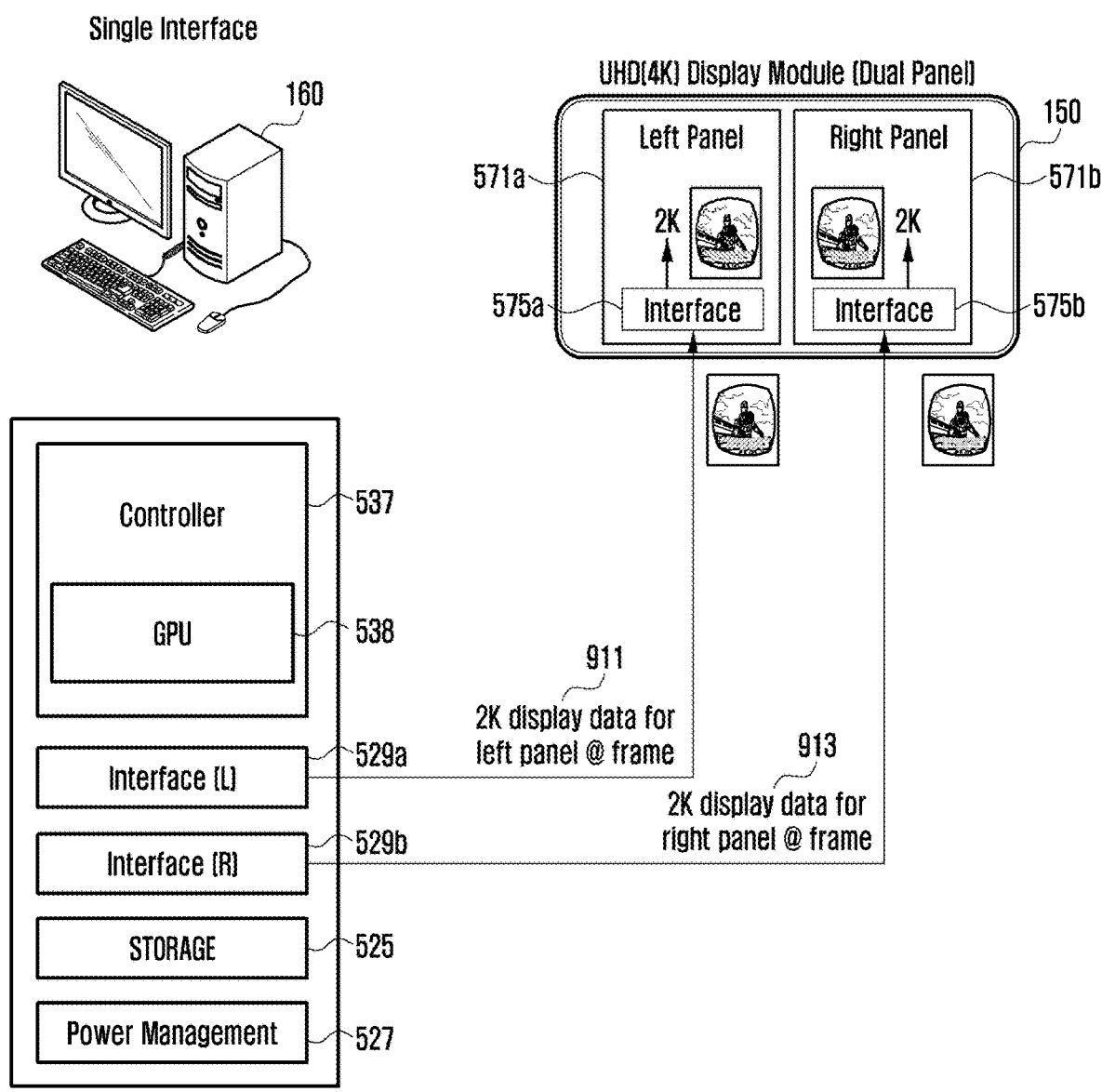

FIGS. 9A to 9B illustrate a method for displaying virtual images with a display module device supporting dual panel display with two physical interfaces, according to an embodiment of the present disclosure.

Referring to FIGS. 9A to 9B, it is possible to display a virtual image (e.g., stereoscopic image) by a display module device 150 supporting dual panel display with left and right image interfaces. When the display module device 150 has two separate interfaces, as shown in FIG. 9B, the external device 160 may regard the display module device 150 as two pieces of display hardware. In this case, the external device 160 separately generates a left image and right image for a virtual image. The HMD apparatus 100 receives the left image and right image from the external device 160 and forwards the left image and right image to the display module device 150 supporting dual panel display. The display module device 150 displays the left image and right image.

Referring to FIG. 9A, in the HMD apparatus 100, a specific application 901 or user program generates a left surface (surface 1) and a right surface (surface 2). SurfaceFlinger 903 combines several left surfaces into a single left surface, and combines several right surfaces into a single right surface. SurfaceFlinger 903 between the application 901 and LCD Driver 905 sends the composited left surface and the composited right surface respectively to the framebuffers of LCD Driver 905. LCD Driver 905 displays the composited left surface on the first display and displays 907 the composited right surface on the second display.

Referring to FIG. 9B, the external device 160 may support dual interfaces and the display module device 150 installed in the frame 110 of the HMD apparatus 100 may support dual panel display. The display module device 150 may have a 4K resolution. As the display module device 150 supports dual panel display, the HMD apparatus 100 receives a 4K resolution left image 911 from the first interface 529*a* of the external device 160 and forwards the left image 911 to the first interface 575*a* of the display module device 150, and receives a 4K resolution right image 913 from the second interface 529*b* of the external device 160 and forwards the right image 913 to the second interface 575*b* of the display module device 150. The display module device 150 displays the 4K resolution left image 911 and 4K resolution right image 913 on the left panel 571*a* and right panel 571*b*, respectively.

Figure 10:
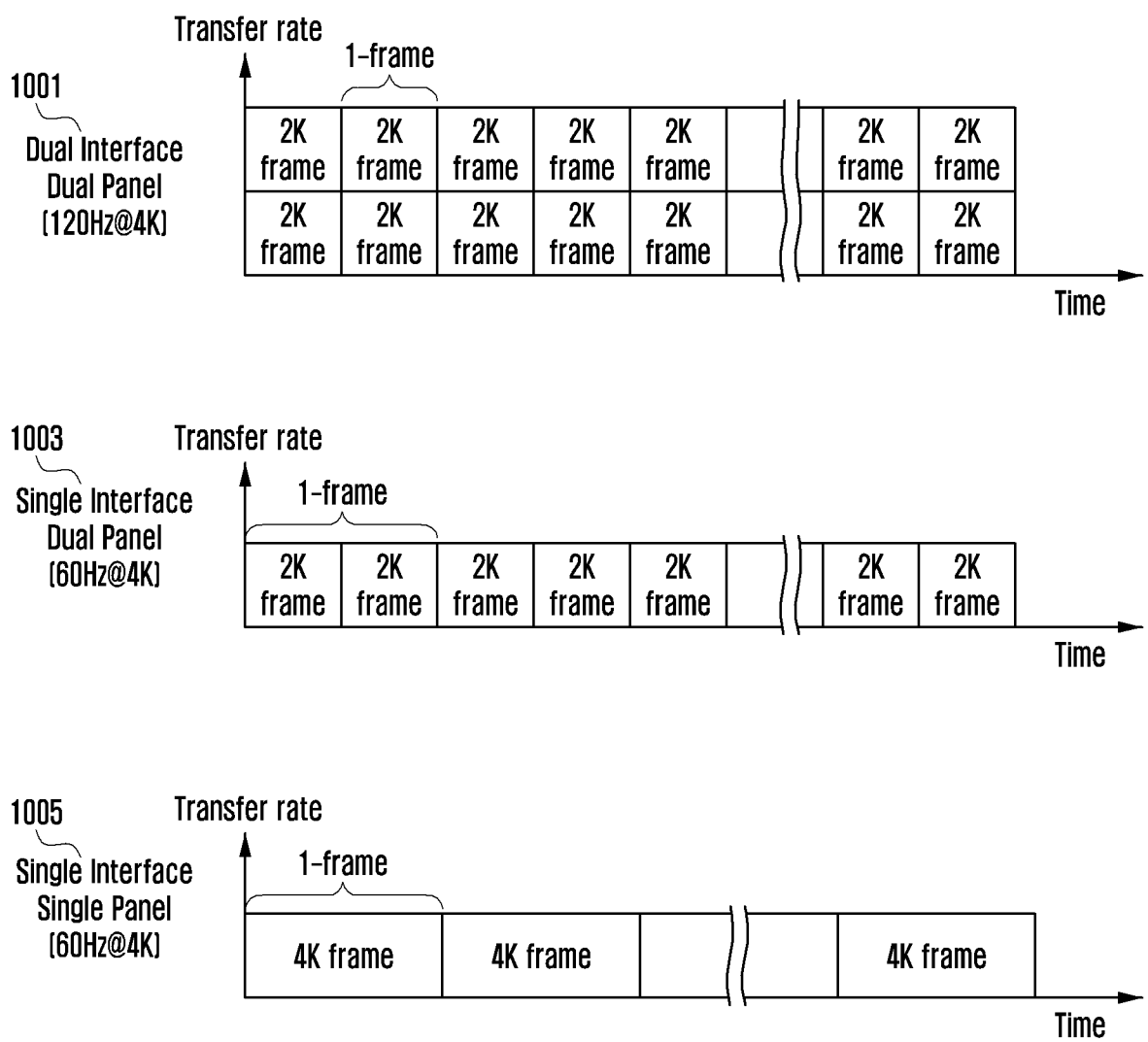
FIG. 10 illustrates refresh rates according to various configurations of an external device installed in a frame of an HMD apparatus, according to an embodiment of the present disclosure.

FIG. 10 illustrates refresh rates according to various configurations of an external device installed in a frame of an HMD apparatus, according to an embodiment of the present disclosure;

Referring to FIG. 10, in an embodiment, as indicated by reference numeral 1005, the external device 160 may have a single interface and the display module device 150 may support single panel display. As indicated by reference numeral 1003, the external device 160 may have a single interface and the display module device 150 may support dual panel display. As indicated by reference numeral 1001, the external device 160 may have dual interfaces and the display module device 150 may support dual panel display.

As shown in FIG. 10, the refresh rate may be 60 Hz when the external device 160 has a single interface (as shown by reference numerals 1003 and 1005), and may be 120 Hz when the external device 160 has dual interfaces and the display module device 150 supports dual panel display (as shown by reference numerals 1001). The high refresh rate for the case indicated by reference numeral 1001 (twice that for the case indicated by reference numerals 1003 or 1005) can resolve the problem of motion sickness due to afterimages caused by head tracking and movement.

Figure 11:
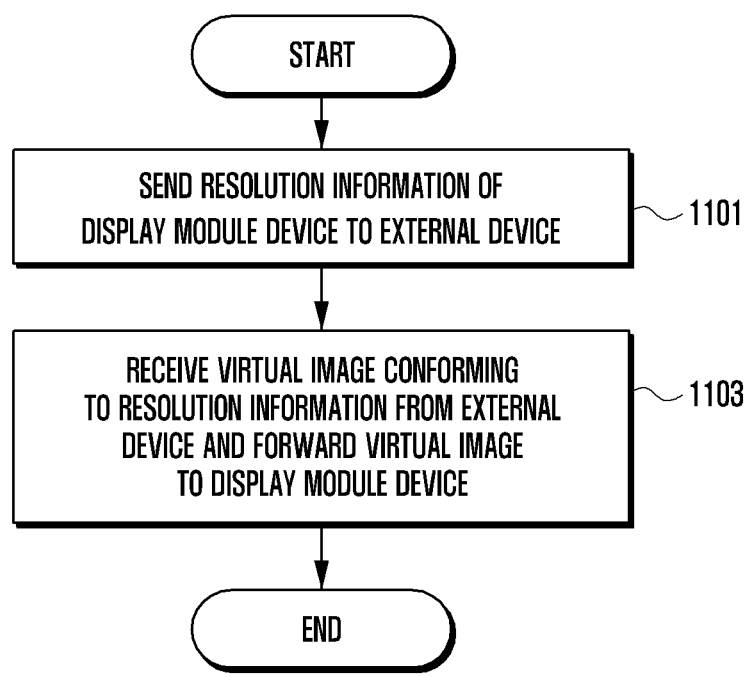
FIG. 11 is a flowchart of a procedure for displaying virtual images corresponding to the resolution of a display module device installed in a frame of an HMD apparatus according to an embodiment of the present disclosure.

FIG. 11 is a flowchart of a procedure for displaying virtual images corresponding to the resolution of a display module device installed in a frame of an HMD apparatus according to an embodiment of the present disclosure.

Referring to FIG. 11, when the external device 160 is connected to the frame 110 of the HMD apparatus 100 or the display module device 150, it is possible to display a virtual image generated by the external device 160 through the display module device 150. Here, the display module device 150 may have multiple resolutions.

Referring to FIG. 11, which depicts details of step 209 in FIG. 2, at step 1101, the HMD apparatus 100 obtains resolution information of the display module device 150 installed in the frame 110 and sends the resolution information to the external device 160. The resolution information of the display module device 150 is obtained by examining the circuit configuration of the interface unit thereof. The external device 160 generates a virtual image corresponding to the received resolution information. At step 1103, the HMD apparatus 100 receives a virtual image corresponding to the resolution information from the external device 160 and forwards the virtual image to the display module device 150. The display module device 150 displays the received virtual image.

It is described above that the resolution information of the display module device 150 is obtained by examining the circuit configuration of the interface unit thereof. However, the present disclosure is not limited thereto or thereby. It is also possible to identify the resolution information of the display module device 150 by detecting an electrical change in the interface unit thereof.

Figure 12:
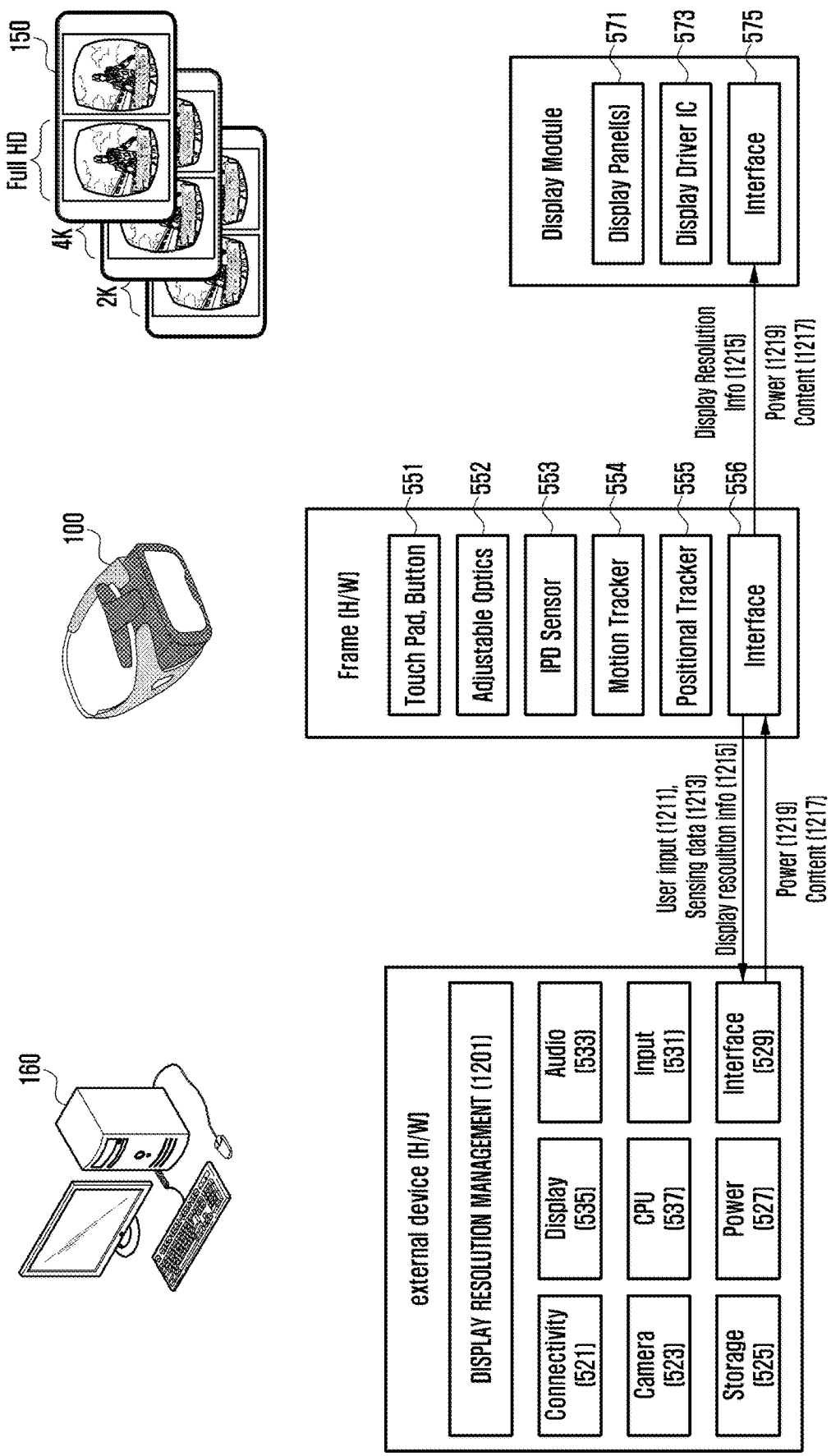
FIG. 12 illustrates a configuration for displaying virtual images corresponding to resolution information of a display module device installed in a frame of an HMD apparatus, according to an embodiment of the present disclosure.

FIG. 12 illustrates a configuration for displaying virtual images corresponding to resolution information of a display module device installed in a frame of an HMD apparatus, according to an embodiment of the present disclosure.

Referring to FIG. 12, the display module device 150 may have multiple resolutions. When the display module device 150 is installed in the frame 110, the HMD apparatus 100 identifies resolution information of the display module device 150. Here, the HMD apparatus 100 receives resolution information (display resolution info 1215) from the interface unit 575 of the display module device 150. The HMD apparatus 100 forwards the received resolution information 1215 to the external device 160. The HMD apparatus 100 may also send the external device 160 user input information 1211 for virtual image display control and sensing information 1213 related to head tracking.

The external device 160 generates a virtual image matching the resolution of the display module device 150 on the basis of the resolution information 1215, user input information 1211, and sensing information 1213. Specifically, the external device 160 uses the display resolution management unit 1201 to generate a virtual image conforming to the resolution of the display module device 150 on the basis of the resolution information 1215, user input information 1211, and sensing information 1213. The external device 160 sends the generated virtual image 1217 to the HMD apparatus 100. The HMD apparatus 100 forwards the received virtual image 1217 to the display module device 150. In the external device 160, the display resolution management unit 1201 reprocesses an existing virtual image, and the graphics processing unit is used to generate a virtual image matching the resolution information.

The external device 160 includes a power management unit 527, and supplies power 1219 to the HMD apparatus 100 and display module device 150.

Figure 13:
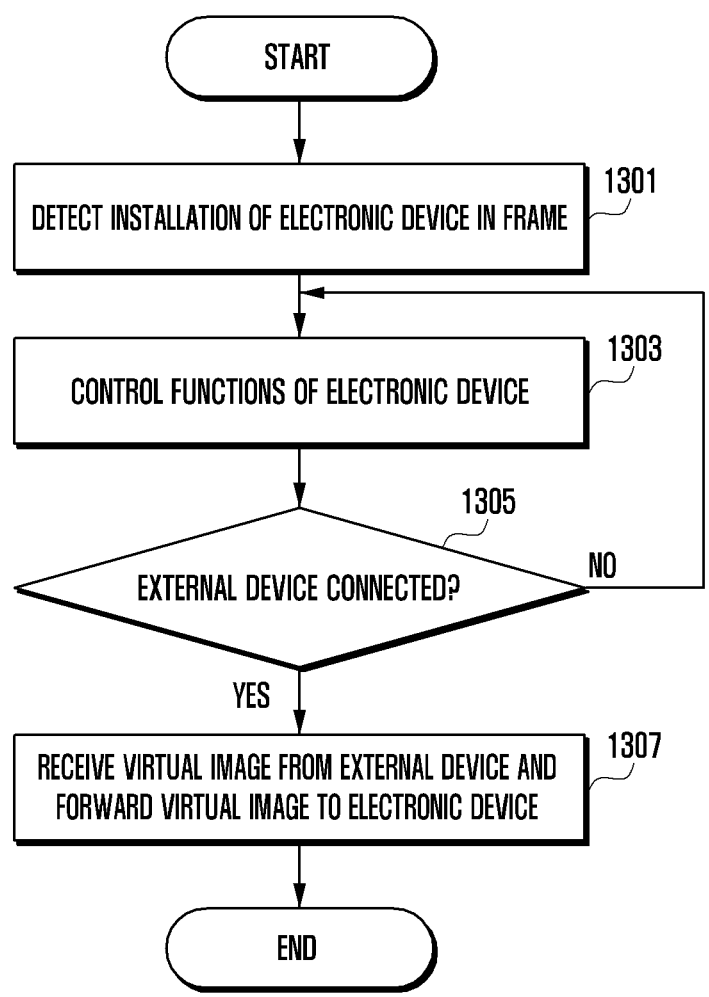
FIG. 13 is a flowchart of a procedure for connecting an external device when an electronic device is installed in a frame of an HMD apparatus, according to an embodiment of the present disclosure.

FIG. 13 is a flowchart of a procedure for connecting an external device when an electronic device is installed in a frame of an HMD apparatus, according to an embodiment of the present disclosure.

Referring to FIG. 13, at step 1301, the HMD apparatus 100 detects installation of the electronic device 120 in the frame 110. Upon detecting installation of the electronic device 120, at operation 1303, the HMD apparatus 100 controls the interface unit according to the first interface mode. For example, the electronic device 120 generates and displays a virtual image in the first interface mode. At step 1305, the HMD apparatus 100 determines whether an external device 160 is connected to the frame 110 or electronic device 120 through wired or wireless communication. If an external device 160 is connected, at step 1307, the HMD apparatus 100 receives a virtual image from the external device 160 and forwards the virtual image to the electronic device 120, which then displays the received virtual image. If an external device 160 is not connected, the procedure returns to step 1303.

Figure 14:
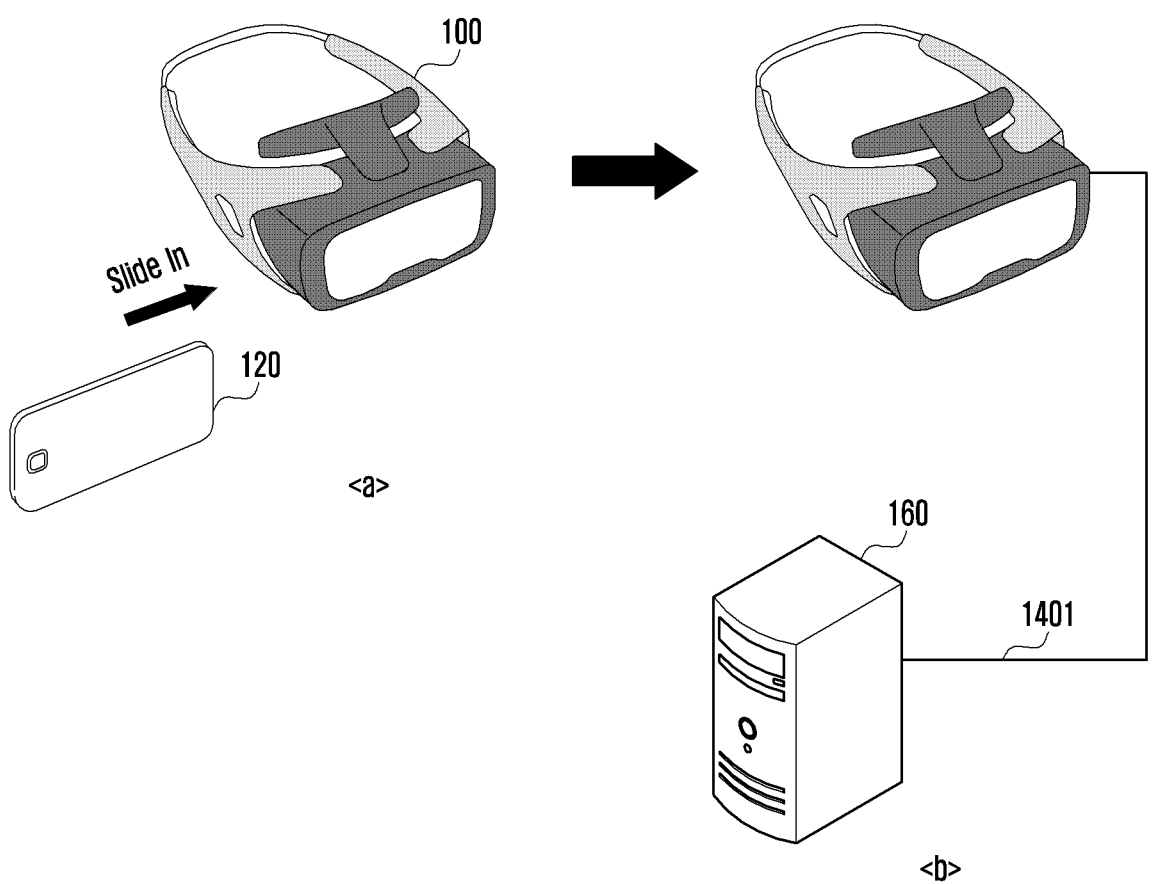
FIG. 14 illustrates a configuration for connecting an external device when an electronic device is installed in a frame of an HMD apparatus, according to an embodiment of the present disclosure.

FIG. 14 illustrates a configuration for connecting an external device when an electronic device is installed in a frame of an HMD apparatus, according to an embodiment of the present disclosure.

As shown <a> of FIG. 14, the HMD apparatus 100 detects installation of the electronic device 120 in the frame 110. After being installed in the frame 110, the electronic device 120 generates a virtual image and displays the virtual image on the display unit thereof. While displaying a virtual image through the display unit of the electronic device 120, the HMD apparatus 100 identifies whether the external device 160 is connected to the frame 110 or electronic device 120, as shown in <b> of FIG. 14. After the external device 160 is connected, the HMD apparatus 100 receives a virtual image from the external device 160 and forwards the virtual image to the electronic device 120. Then, the electronic device 120 displays the received virtual image.

In an embodiment, when the external device 160 is connected to the frame 110 or to the display unit of the electronic device 120, the HMD apparatus 100 may deactivate the module or unit for virtual image processing in the electronic device 120.

This is described in more detail with reference to FIGS. 15A and 15B.

Figure 15A:
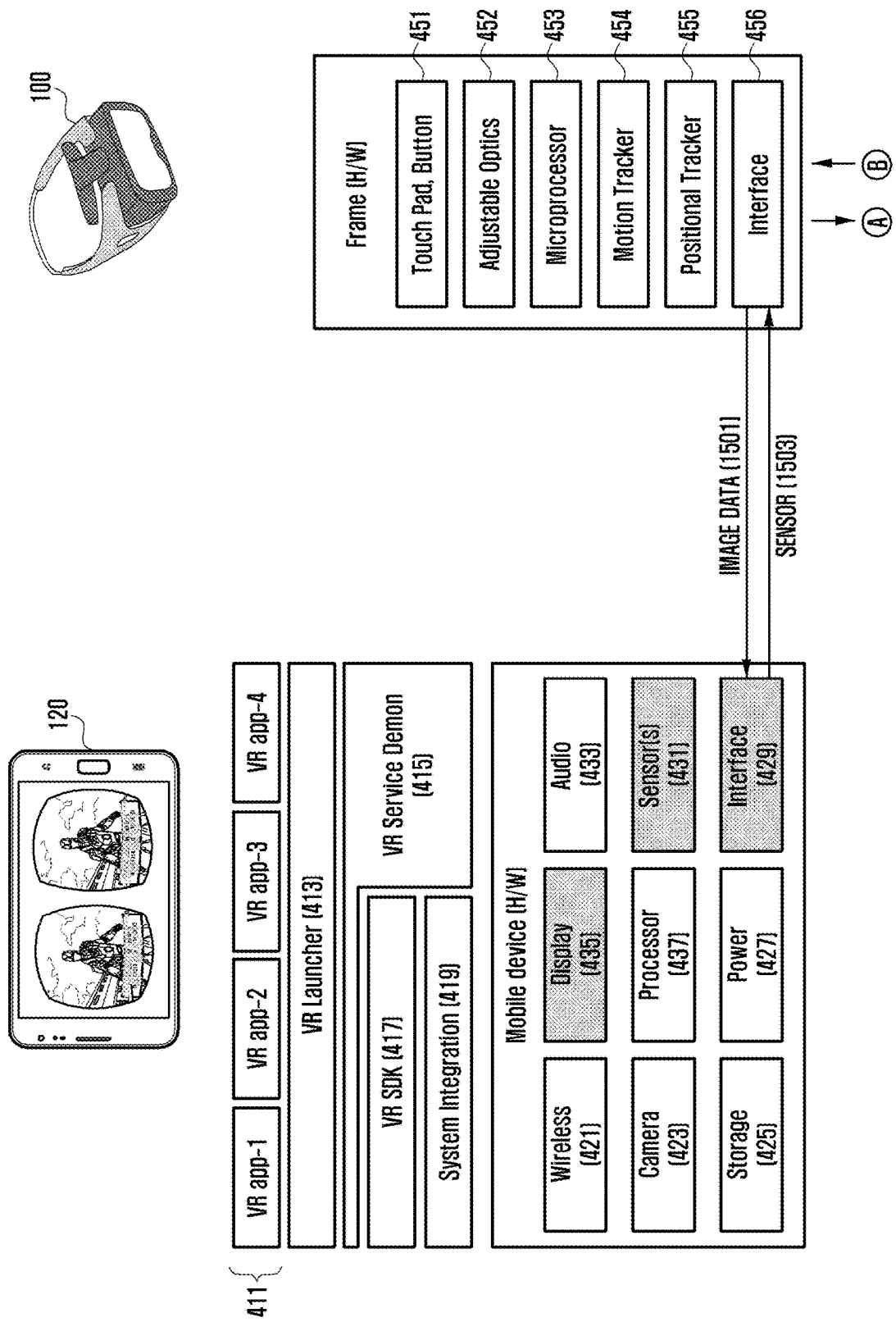
FIGS. 15A and 15B illustrate a linkage between an electronic device installed in a frame of an HMD apparatus and a connected external device, according to an embodiment of the present disclosure.
Figure 15B:
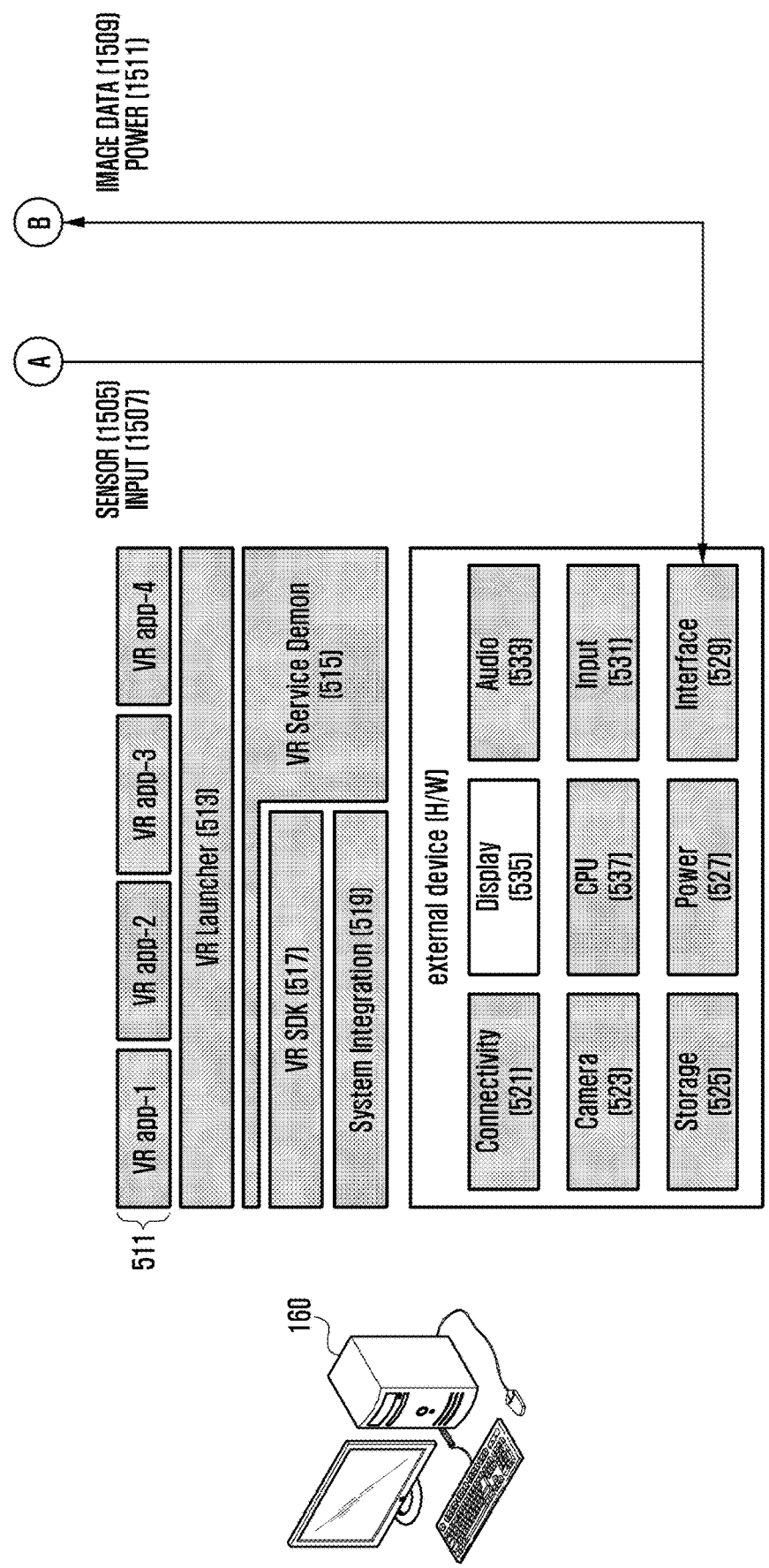

FIGS. 15A and 15B illustrate a linkage between an electronic device installed in a frame of an HMD apparatus and a connected external device, according to an embodiment of the present disclosure.

Referring to FIGS. 15A and 15B, the HMD apparatus 100 detects that the electronic device 120 is installed in the frame 110. In a state where the electronic device 120 is installed in the frame 110, the HMD apparatus 100 identifies that the external device 160 is connected to the frame 110 or electronic device 120. When the external device 160 is connected to the frame 110 or electronic device 120, the HMD apparatus 100 may deactivate the wireless unit 421, camera 423, storage unit 425, power management unit 427, audio unit 433, display unit 435, and processor 437 of the electronic device 120, and may keep the interface unit 429, sensor unit 431, and display unit 435 of the electronic device 120 active. The HMD apparatus 100 receives sensing data 1503 for head tracking from the sensor unit 431 of the electronic device 120 and forwards the sensing data 1505 to the external device 160. In addition, the HMD apparatus 100 receives user input information 1507 through the touchpad or button and forward the user input information to the external device 160.

In an embodiment, when the external device 160 is connected to the frame 110 or electronic device 120, the HMD apparatus 100 may deactivate the connectivity unit 521, camera 523, storage unit 525, power management unit 527, interface unit 529, input unit 531, and audio unit of the external device 160. The HMD apparatus 100 may also deactivate the display unit 535 of the external device 160.

In other words, upon detecting that the external device 160 is connected to the frame 110 or electronic device 120, the HMD apparatus 100 may deactivate those components of the electronic device 120 related to virtual image generation and may activate those components of the external device 160 related to virtual image generation.

The external device 160 generates a virtual image on the basis of the sensing data 1505 and user input information 1507 received from the electronic device 120 or HMD apparatus 100. The HMD apparatus 100 receives the virtual image 1509 from the external device 160 and forwards the virtual image 1501 to the electronic device 120. The external device 160 may also supply power 1511 to the electronic device 120.

In FIGS. 15A and 15B, the shaded components are deactivated when the external device 160 is connected to the frame 110 or electronic device 120. However, the present disclosure is not limited thereto, and the deactivated or activated components may vary according to situations.

In the above embodiments for virtual image display, it is described that the external device 160 is connected after the electronic device 120 is installed in the frame 110. However, the present disclosure is not limited thereto. Virtual image display may be carried out when the electronic device 120 is installed in the frame 110 after the external device 160 is connected to the frame 110.

Figure 16:
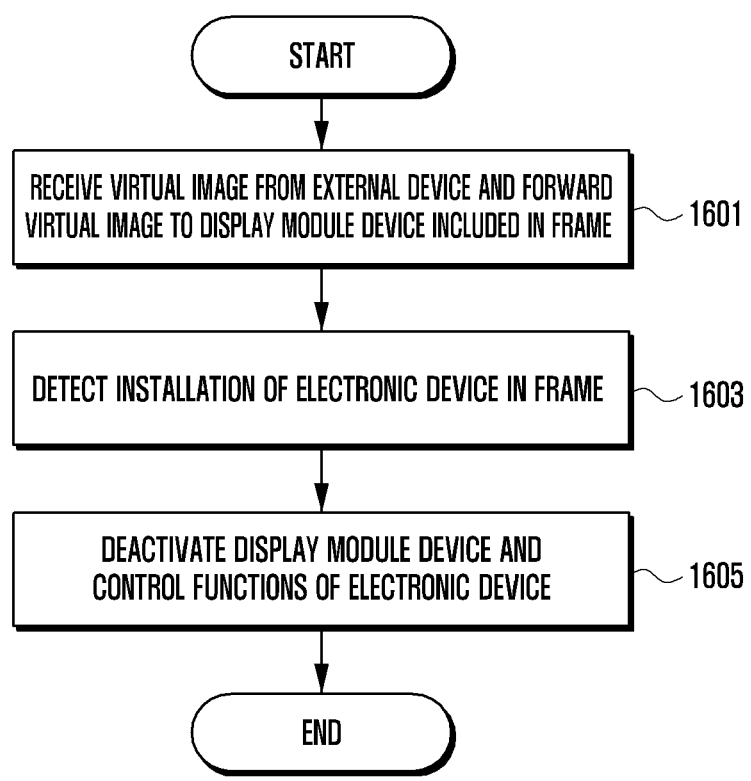
FIG. 16 is a flowchart of a procedure for displaying virtual images when an electronic device is installed in a frame of an HMD apparatus having a display module device, according to an embodiment of the present disclosure.

FIG. 16 is a flowchart of a procedure for displaying virtual images when an electronic device is installed in a frame of an HMD apparatus having a display module device, according to an embodiment of the present disclosure.

Referring to FIG. 16, the HMD apparatus 100 includes a display module device 150. At step 1601, the HMD apparatus 100 receives a virtual image from an external device 160 and forwards the virtual image to the display module device 150 included in the frame 110. At step 1603, the HMD apparatus 100 detects that an electronic device 120 is installed in the frame 110. When the electronic device 120 is installed in the frame 110, at step 1605, the HMD apparatus 100 deactivates the display module device 150 included in the frame 110 and controls the electronic device 120 according to the first interface mode. In the first interface mode, the electronic device 120 generates a virtual image and display the virtual image on the display unit of itself.

Figure 17A:
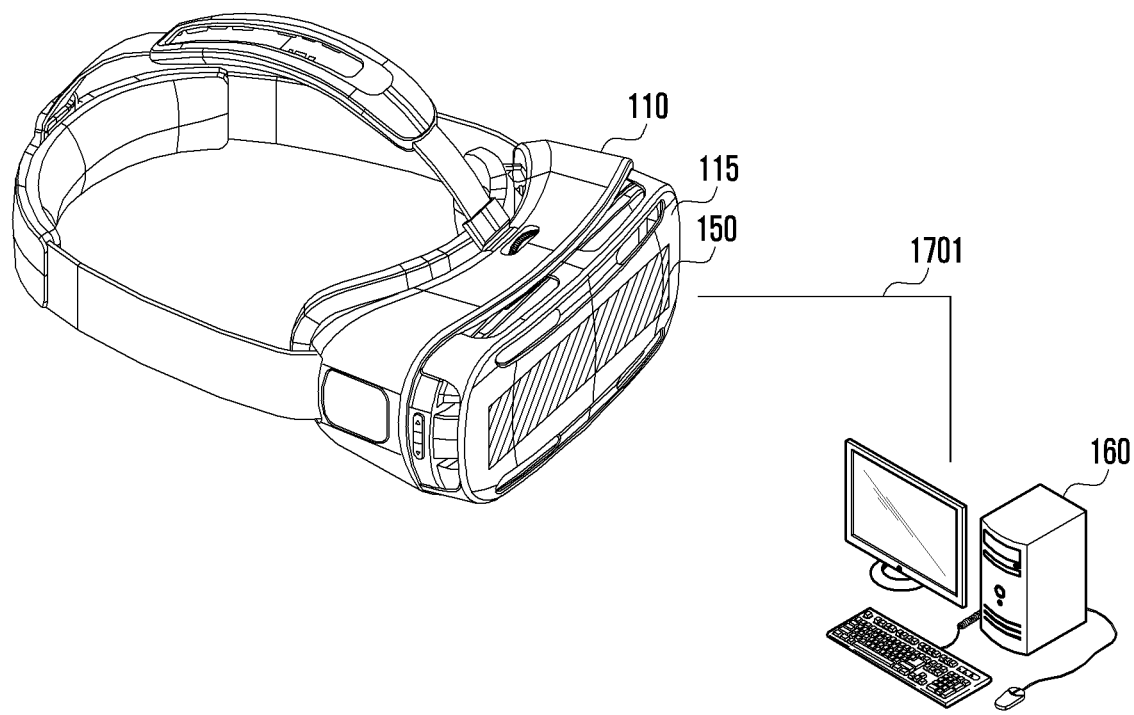
FIGS. 17A and 17B illustrate the configuration of a HMD apparatus having a display module device, according to an embodiment of the present disclosure.
Figure 17B:
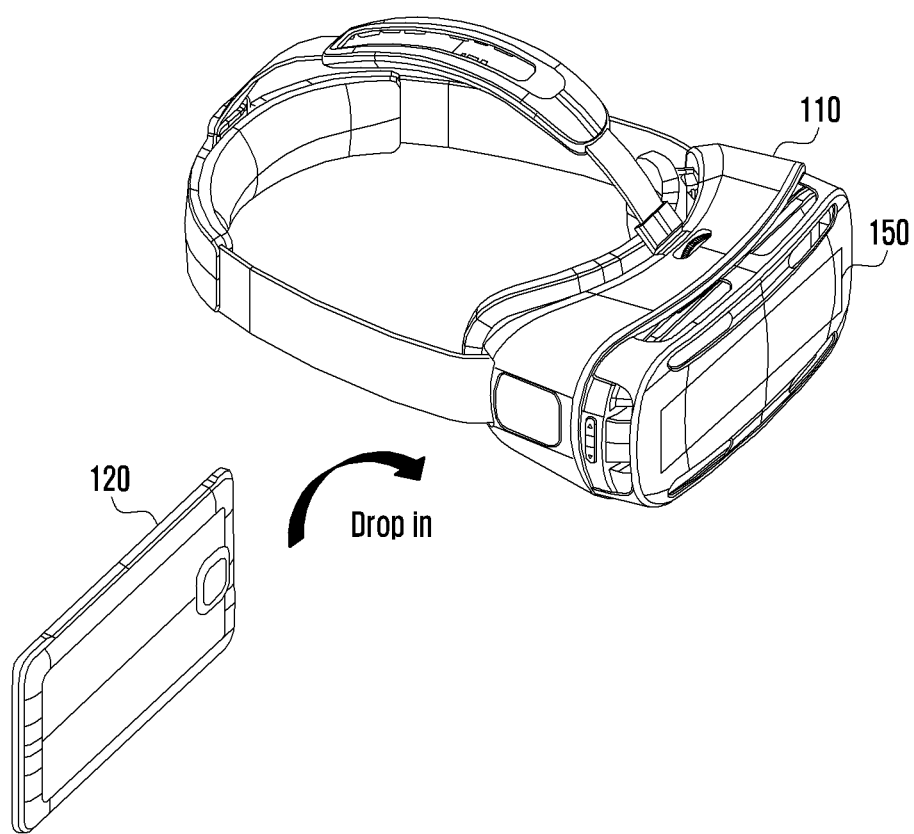

FIGS. 17A and 17B illustrate the configuration of a HMD apparatus having a display module device, according to an embodiment of the present disclosure.

Referring to FIG. 17A, the HMD apparatus 100 includes a display module device 150. The display module device 150 may be included in the inside or outside of the frame 110. The display module device 150 may be included in the cover 115 removably coupled to a portion of the frame 110. The display module device 150 included in the cover 115 detects that an external device 160 like a PC is connected 1701 to the display module device 150. When the external device 160 is connected to the display module device 150, the HMD apparatus 100 sends the display module device 150 a virtual image that is generated by a high-performance application running on the external device 160. The display module device 150 displays the virtual image generated by a high-performance application.

Referring to FIG. 17B, when an electronic device 120 is installed in the HMD apparatus 100 including a display module device 150, the HMD apparatus 100 controls the function of the electronic device 120. That is, the electronic device 120 may directly generate a virtual image and display the virtual image on the display unit thereof. When the electronic device 120 is installed in the frame 110 of the HMD apparatus 100, the HMD apparatus 100 may deactivate the display module device 150 included in the HMD apparatus 100. When the electronic device 120 is uninstalled from the frame 110, the HMD apparatus 100 may activate the display module device 150 included in the HMD apparatus 100. Accordingly, in an embodiment, the HMD apparatus 100 may receive high-quality content from an external device 160. When an electronic device 120 is installed in the frame 110 of the HMD apparatus 100, the user may enjoy the high-quality content through the electronic device 120 outdoors or at various places.

Figure 18A:
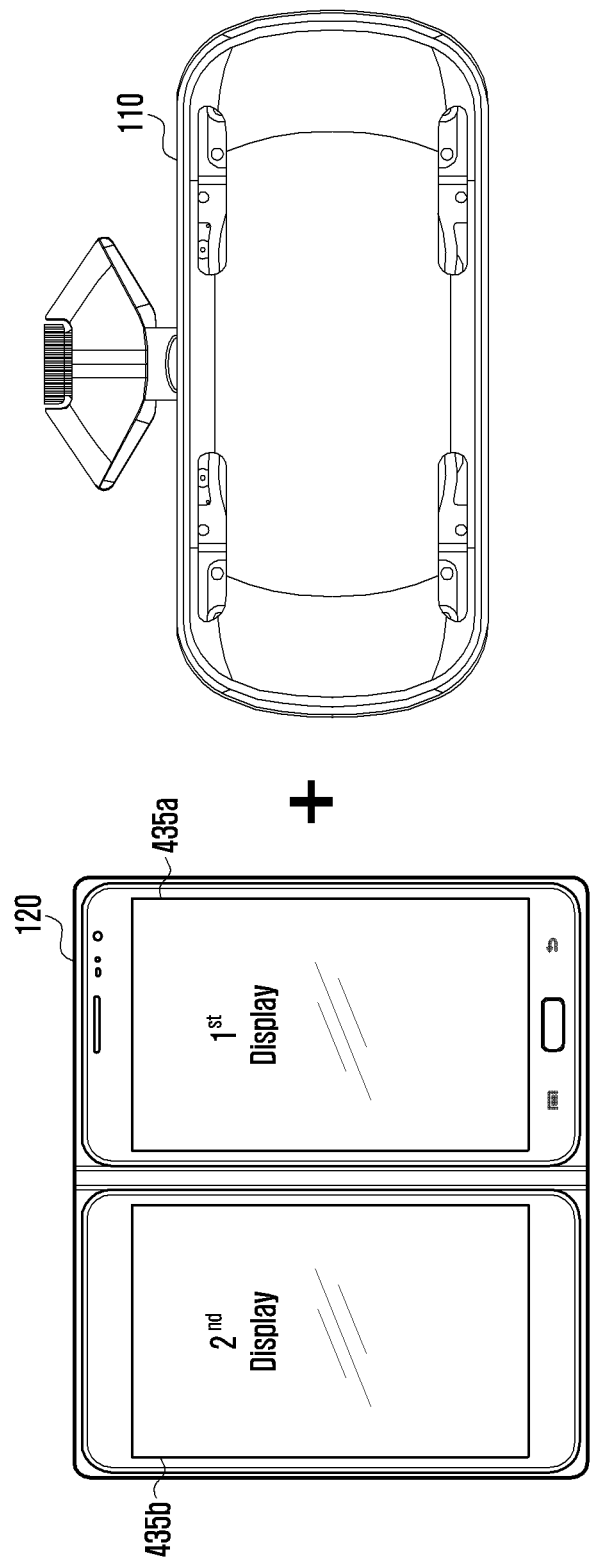
FIGS. 18A and 18C illustrate linkage between an electronic device having dual displays and a HMD apparatus, according to an embodiment of the present disclosure.
Figure 18B:
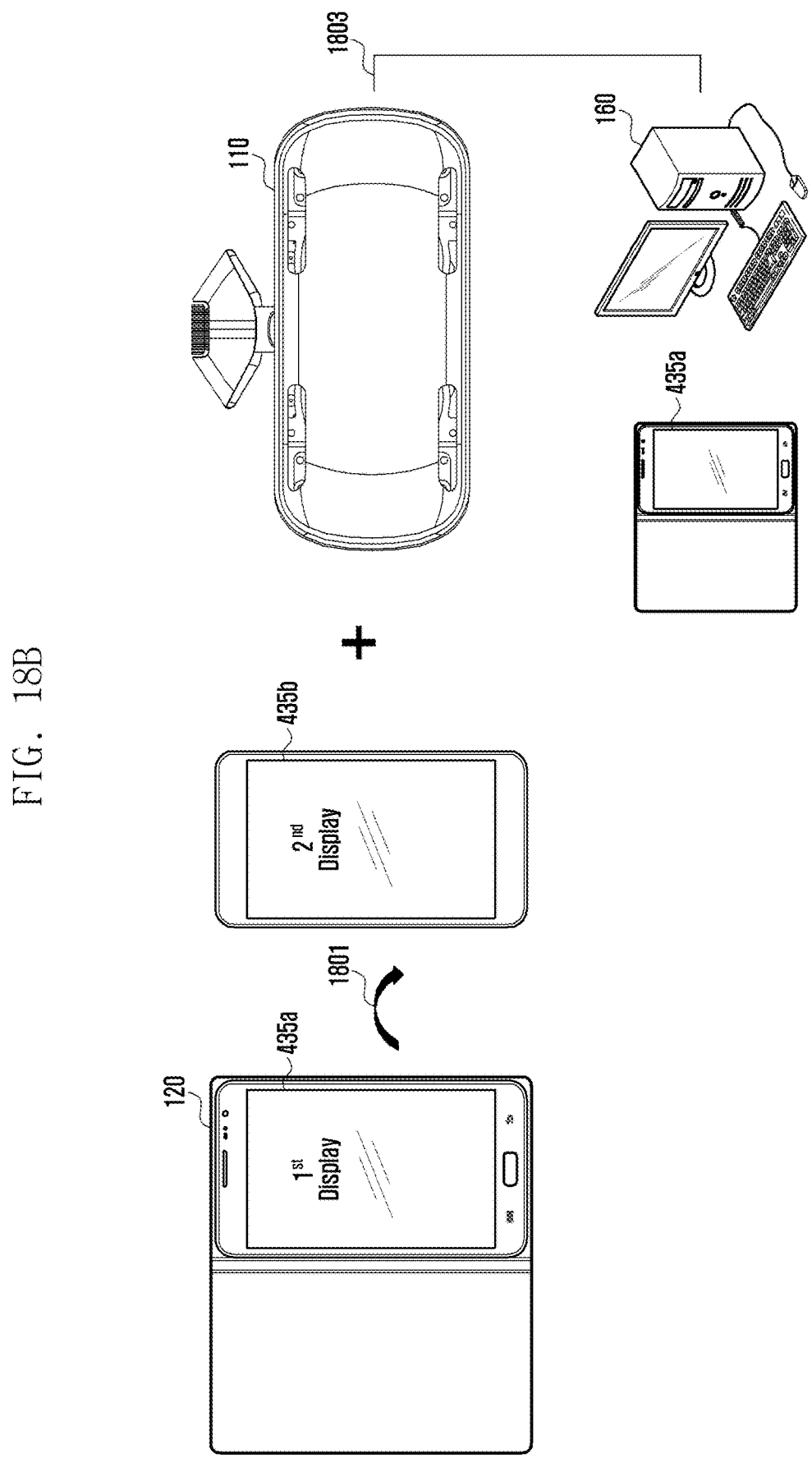
Figure 18C:
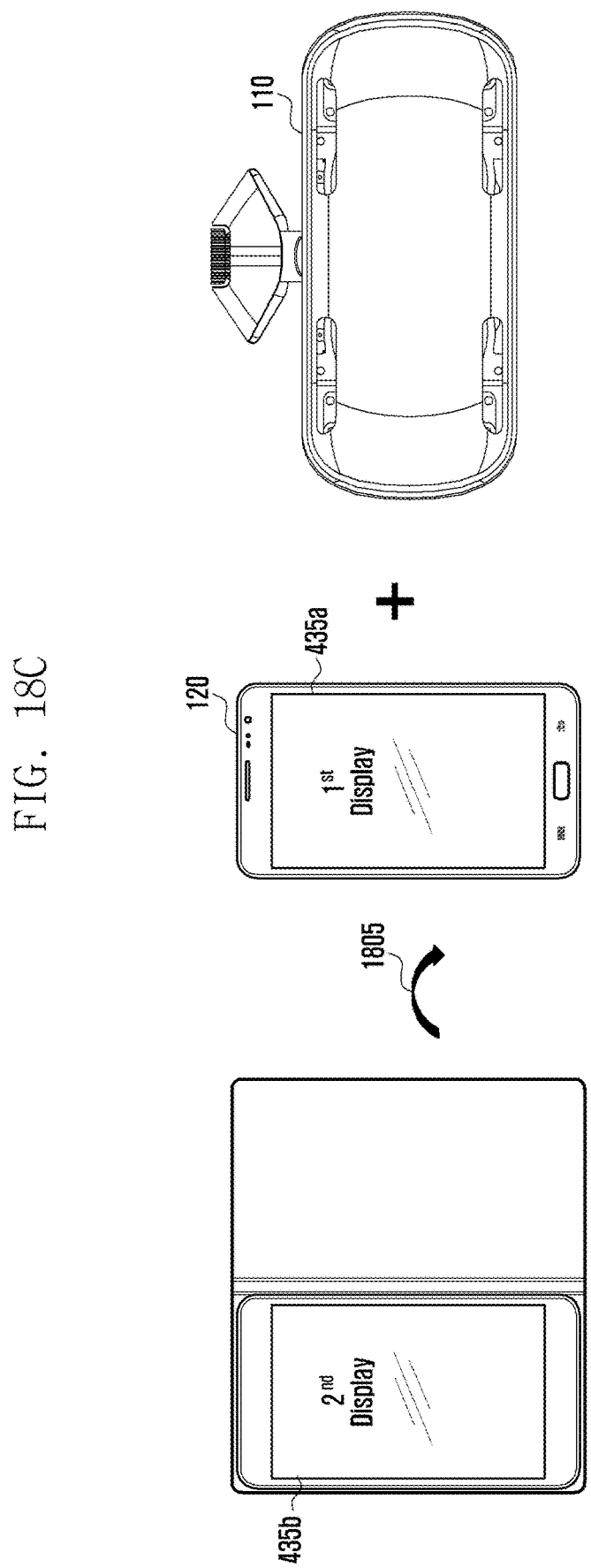

FIGS. 18A and 18C illustrate linkage between an electronic device having dual displays and a HMD apparatus, according to an embodiment of the present disclosure.

Referring to FIG. 18A, the electronic device 120 supporting dual panel display includes a first display unit 435*a* and a second display unit 435*b*. The first display unit 435*a* and the second display unit 435*b* may be configured in a foldable manner. The first display unit 435*a* and the second display unit 435*b* may each include a touchscreen. The first display unit 435*a* and the second display unit 435*b* may be coupled to each other, and may be coupled through a fixing member coupling one side of the first display unit 435*a* and one side of the second display unit 435*b* together. The first display unit 435*a* and the second display unit 435*b* may be coupled through the fixing member and may be connected. The first display unit 435*a* and the second display unit 435*b* may be removable. As being removable, one of the first display unit 435*a* and the second display unit 435*b* may be installed in the frame 110 of the HMD apparatus 100.

In an embodiment, at least one of the first display unit 435*a* and the second display unit 435*b* may include a graphics processing mechanism to generate a virtual image.

In an embodiment, at least one of the first display unit 435*a* and the second display unit 435*b* may be installed in the frame 110 of the HMD apparatus 100. One display unit not installed in the frame 110 may be used to control the other display unit installed in the frame 110. For example, when the first display unit 435*a* is installed in the frame 110, the second display unit 435*b* may be used to process and display a virtual image. As another example, when the first display unit 435*a* is installed in the frame 110, the second display unit 435*b* may be used to process a virtual image and the first display unit 435*a* installed in the frame 110 may be used to display the processed virtual image.

Referring to FIG. 18B, the second display unit 435*b* may be detached from the electronic device 120 and installed in the frame 110 of the HMD apparatus 100 (indicia 1801). At this time, the first display unit 435*a* may be used to generate a virtual image to be displayed on the second display unit 435*b*.

Upon detecting that the second display unit 435*b* is installed in the frame 110, the HMD apparatus 100 receives a virtual image from the first display unit 435*a* and forwards the virtual image to the second display unit 435*b*. The second display unit 435*b* may display the virtual image received from the HMD apparatus 100. That is, the second display unit 435*b* may display a virtual image received only from the first display unit 435*a* without virtual image generation. Alternatively, the first display unit 435*a* is used as a controller that receives an input for virtual image control from the input unit and forwards the input to the second display unit 435*b*.

In an embodiment, the HMD apparatus 100 detects that an external device 160 capable of virtual image processing is connected to the first display unit 435*a* installed in the frame 110 (indicia 1803). When an external device 160 is connected to the first display unit 435*a*, the HMD apparatus 100 receives a virtual image from the external device 160 and forwards the virtual image to the first display unit 435*a*. The first display unit 435*a* displays the received virtual image.

The configuration described above is similar to the case where the display module device 150 is installed in the frame 110 of the HMD apparatus 100; the external device 160 is connected to the display module device 150; the HMD apparatus 100 receives a virtual image from the external device 160 and forwards the virtual image to the display module device 150; and the display module device 150 displays the virtual image.

Referring to FIG. 18C, the first display unit 435a may be detached from the electronic device 120 and installed in the frame 110 of the HMD apparatus 100 (indicia 1805). The first display unit 435a may have a virtual image processing mechanism. The first display unit 435a may directly process and display a virtual image. That is, the first display unit 435a may generate a virtual image and display the generated virtual image by itself.

This configuration is similar to the case where when the electronic device 120 is installed in the frame 110 of the HMD apparatus 100, the HMD apparatus 100 controls the electronic device 120 to directly generate and display a virtual image.

In an embodiment, the second display unit 435b may further include a graphics processing mechanism, a communication mechanism, and a power management mechanism. The second display unit 435b may be used as a controller that receives an input from the input unit and forwards the input for controlling a virtual image being displayed.

Figure 19A:
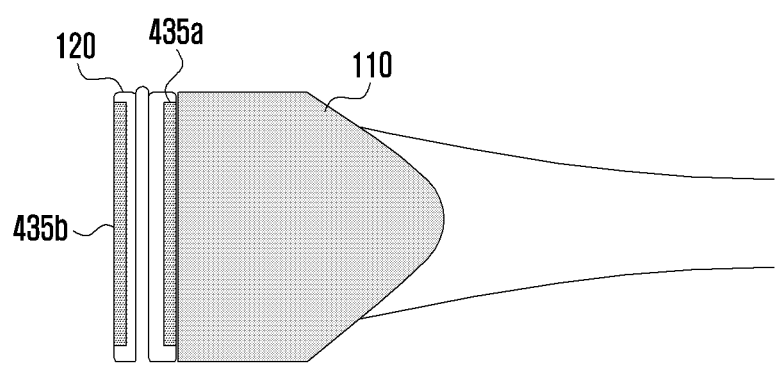
FIGS. 19A and 19B illustrate installation of an electronic device having dual displays in a frame of a HMD apparatus, according to an embodiment of the present disclosure.
Figure 19B:
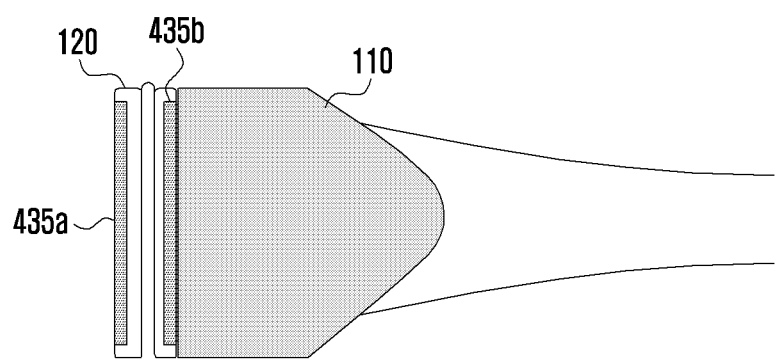

FIGS. 19A and 19B illustrate installation of an electronic device having dual displays in a frame of a HMD apparatus, according to an embodiment of the present disclosure.

Referring to FIG. 19A, the electronic device 120 having two display units may be folded and installed in the frame 110 of the HMD apparatus 100. The electronic device 120 is installed in the frame 110 so that the first display unit 435a faces the lens unit. In this case, the first display unit 435a may directly process a virtual image and display the processed virtual image.

In an embodiment, the first display unit 435a performs input processing like touch input. For example, the HMD apparatus 100 may receive hovering input from the input means of the first display unit 435a and perform a function corresponding to the hovering input. For instance, when hovering input is detected while the first display unit 435a is displaying a virtual image, the HMD apparatus 100 may display menu icons associated with the virtual image.

This configuration is similar to the case where when the electronic device 120 is installed in the frame 110 of the HMD apparatus 100, the electronic device 120 generates a virtual image and displays the virtual image on the display unit of the electronic device 120.

Referring to FIG. 19B, the electronic device 120 having two display units may be folded and installed in the frame 110 so that the second display unit 435b faces the lens unit. In this case, the second display unit 435b receives a virtual image from the external device 160 being connected and displays the virtual image by itself. This configuration is similar to the case where when the external device 160 is connected after the display module device 150 is installed in the frame 110 of the HMD apparatus 100, the display module device 150 receives a virtual image from the external device 160 and displays the received virtual image by itself.

As previously described, the first display unit 435a and the second display unit 435b may be coupled together through a fixing member and may be connected.

In an embodiment, when the first display unit 435a is installed in the frame 110 of the HMD apparatus 100, the second display unit 435b may mirror the virtual image displayed on the first display unit 435a. The second display unit 435b may also act as an input means for touch input or the like.

FIGS. 20A to 20E illustrate shapes of a display module device, according to an embodiment of the present disclosure.

In an embodiment, the display module device 150 is detached from the frame 110 of the HMD apparatus 100 and may be used in various forms. The display module device 150 may include a physically foldable display panel or may have a mechanically segmentable structure.

Figure 20A:
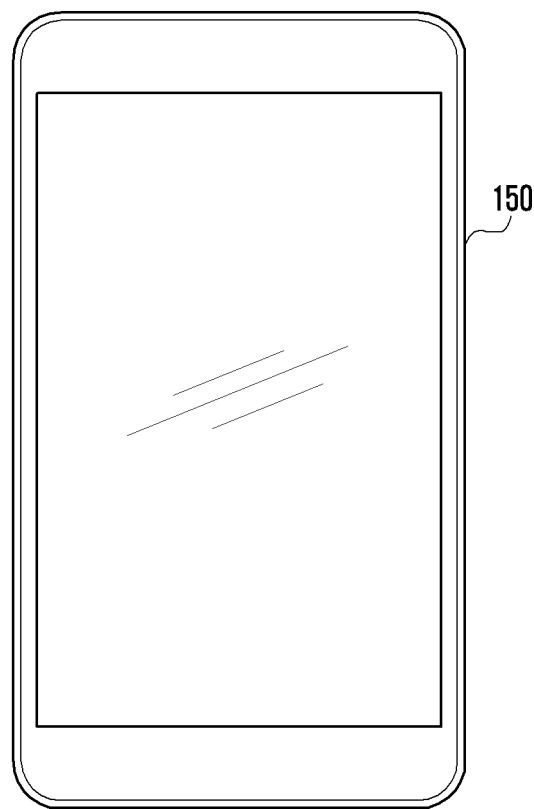
FIGS. 20A to 20E illustrate shapes of a display module device, according to an embodiment of the present disclosure.

Referring to FIG. 20A, the display module device 150 includes a single display panel. The display module device 150 includes a flexible display. The flexible display, using a thin and flexible substrate, like a sheet of paper, can be curved, bended and rolled without damage. That is, the display module device 150 is foldable.

Figure 20B:
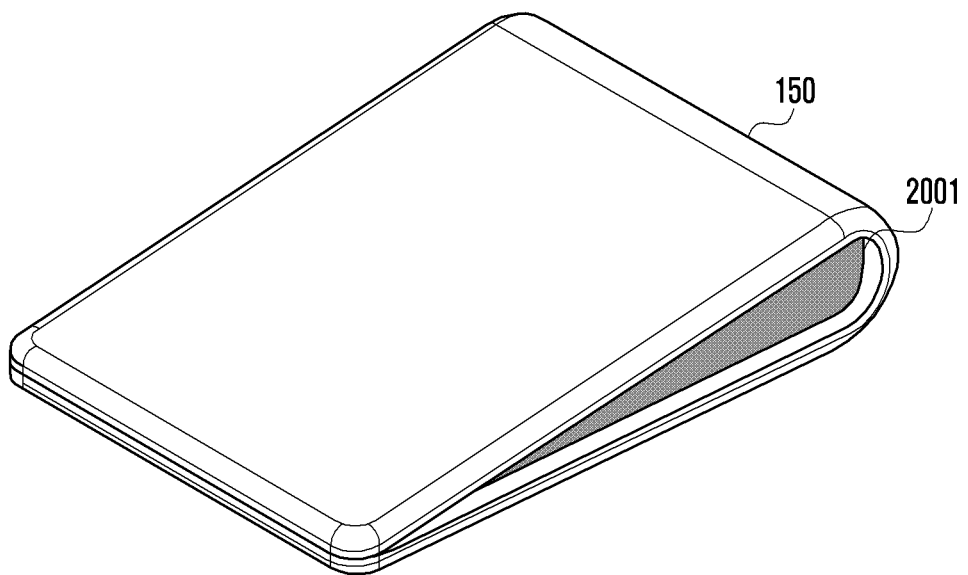

Referring to FIG. 20B, the display module device 150 may have physically separable display units. The display module device 150 may have a mechanical member 2001 enabling the display module device 150 to be folded.

Figure 20C:
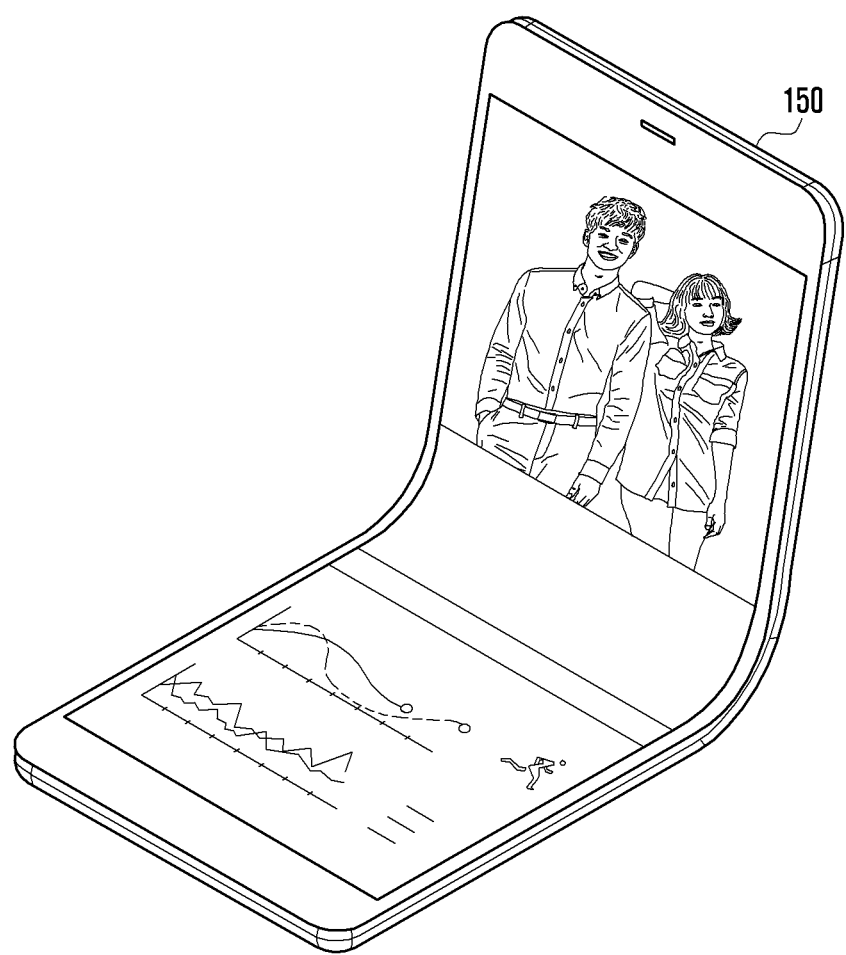
Figure 20D:
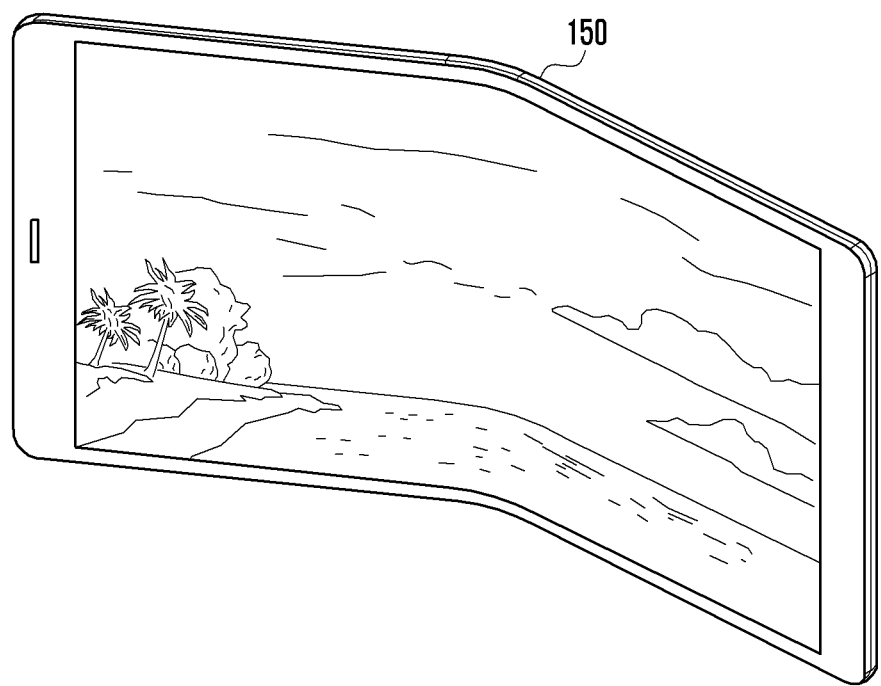
Figure 20E:
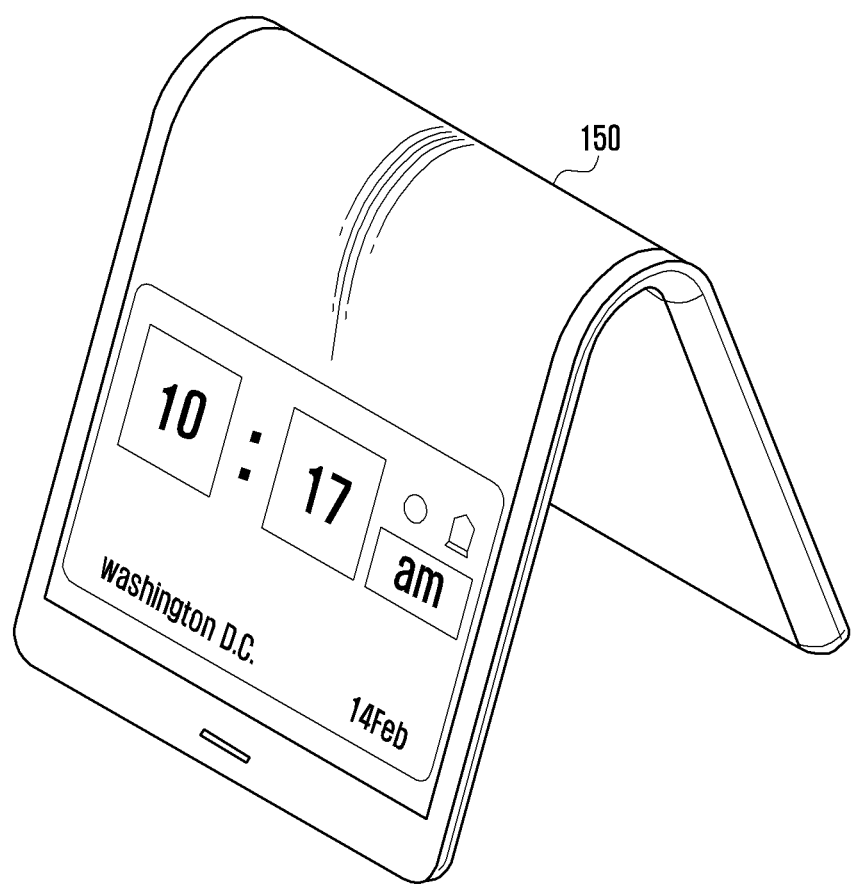

Referring to FIGS. 20C, 20D, and 20E, the display module device 150 may be connected to an external device 160 and display content received from the external device 160. For example, the display module device 150 may display content received from an external device 160 connected while it is folded forward as shown of FIGS. 20C and 20D or folded backward as shown FIG. 20E.

The present disclosure provides a HMD apparatus allowing installation and removal of multiple devices. Hence, the user may enjoy graphical information according to the currently installed device. In other words, the HMD apparatus may provide multiple interface modes corresponding to various user environments, and the user may effectively utilize the HMD apparatus in an interface mode corresponding to the current user environment.

The various embodiments of the present disclosure described herein have been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents. Therefore, the scope of the present disclosure is defined, not by the detailed description and embodiments, but by the following claims and their equivalents.

What is claimed is:

1. A head-mounted display (HMD) apparatus comprising:
a frame;
an interface unit; and
a processor configured to:
identify a device installed in the frame of the HMD apparatus, and
control the interface unit to control a function of the device in an interface mode corresponding to the identified device installed in the frame based on the identification result,
wherein the processor is further configured to:
when an electronic device is installed in the frame, control the interface unit to control a function of the electronic device in a first interface mode corresponding to the electronic device, wherein the first interface mode is a mode for displaying an image processed by a processor of the electronic device on a display of the electronic device, when a display is installed in the frame, control the interface unit to control a function of the display in a second interface mode corresponding to the display, wherein the second interface mode is a mode for receiving and displaying an image processed by a processor of an external device, and switch to the second interface mode, when the external device is connected to the frame or the electronic device during the first interface mode.

2. The HMD apparatus of claim 1, further comprising a sensor unit to sense movement of the HMD apparatus, wherein the processor is further configured to send a sensor signal sensed by the sensor unit to the device installed in the frame or the external device via the interface unit.

3. The HMD apparatus of claim 1, wherein, when the electronic device is installed in the frame, the processor is further configured to output an audio signal received from the electronic device.

4. The HMD apparatus of claim 3, wherein the electronic device comprises multiple removable display units.

5. The HMD apparatus of claim 4, wherein the multiple removable display units include a first display unit and a second display unit, wherein, when the first display unit is installed in the frame, the processor is further configured to control an operation of the first display unit, and wherein, when the second display unit is installed in the frame, the processor is further configured to receive a virtual image from the first display unit and forward the virtual image to the second display unit.

6. The HMD apparatus of claim 1, wherein, when the display is installed in the frame, the processor is further configured to determine whether the external device is connected to the frame or the display.

7. The HMD apparatus of claim 6, wherein, when the external device is connected to the frame or the display, the processor is further configured to receive a virtual image from the external device and forward the virtual image to the display.

8. The HMD apparatus of claim 6, wherein, upon determining that the display installed in the frame supports dual interfaces, the processor is further configured to receive left and right virtual images from the external device and forward the left and right virtual images to the display.

9. The HMD apparatus of claim 8, wherein, when the display does not support dual interfaces and supports dual panel display, the processor is further configured to receive a virtual image from the external device and forward the virtual image to the display.

10. The HMD apparatus of claim 6, wherein the processor is further configured to:

obtain resolution information of the display installed in the frame and send the resolution information to the external device, and receive a virtual image conforming to the resolution information from the external device and forward the virtual image to the display.

11. The HMD apparatus of claim 1, wherein, when the external device is connected while the electronic device is installed in the frame, the processor is further configured to receive a virtual image from the external device and forward the virtual image to the display of the electronic device.

12. The HMD apparatus of claim 11, wherein, when the external device is connected, the processor is further configured to deactivate components of the electronic device associated with virtual image generation.

13. A head-mounted display (HMD) apparatus comprising:

a frame having a display;
an interface unit;
a detection unit; and
a processor configured to:
control a function of the display in a first interface mode corresponding to the display, wherein the first interface mode is a mode for receiving and displaying an image processed by a processor of an external device on the display, switch to a second interface mode corresponding to an electronic device when the electronic device is installed in the frame having the display, wherein the second interface mode is a mode for displaying an image processed by a processor of the installed electronic device on a display of the electronic device, and control a function of the electronic device in the second interface mode.

14. The HMD apparatus of claim 13, wherein, when the electronic device is installed in the frame, the processor is further configured to deactivate the display.

15. The HMD apparatus of claim 14, wherein, when the electronic device is installed in the frame, the processor is further configured to receive a virtual image from the external device and forward the virtual image to the electronic device.

16. A method of controlling information output for a head-mounted display (HMD) apparatus, the method comprising:

identifying, when a device is installed in a frame of the HMD apparatus, the device installed in the frame; and controlling a function of the device in an interface mode corresponding to the identified device installed in the frame based on the identification result, wherein controlling the function of the device comprises:

when an electronic device is installed in the frame, controlling a function of the electronic device in a first interface mode corresponding to the electronic device, wherein the first interface mode is a mode for displaying an image processed by a processor of the electronic device on a display of the electronic device;

when a display is installed in the frame, controlling a function of the display in a second interface mode corresponding to the display, wherein the second interface mode is a mode for receiving and displaying an image processed by a processor of an external device; and switching to the second interface mode, when the external device is connected to the frame or the electronic device during the first interface mode.

17. The method of claim 16, wherein, when the display is installed in the frame, controlling the function of the device further comprises determining whether the external device is connected to the frame or the display.

18. The method of claim 16, wherein, when the electronic device installed in the frame, controlling the function of the device further comprises:

determining whether the external device is connected to the frame or the electronic device; and forwarding, when the external device is connected, information received from the external device to the electronic device.

19. The method of claim 18, further comprising deactivating, when the external device is connected, components of the electronic device associated with virtual image generation.

20. The method of claim 18, wherein the electronic device comprises removable first and second display units,
  wherein, when the first display unit is installed in the frame, controlling the function of the device comprises controlling an operation of the first display unit, and
  wherein, when the second display unit is installed in the frame, controlling the function of the device comprises sending a virtual image received from the first display unit to the second display unit.

* * * * *